(12) United States Patent
Pratley et al.

(10) Patent No.: US 6,442,575 B2
(45) Date of Patent: Aug. 27, 2002

(54) METHOD AND SYSTEM FOR MERGING CELLS IN A TABLE AND FOR ADDING AN INTEGRATED HEADER AND A NESTED TABLE TO A TABLE IN AN ELECTRONIC DOCUMENT

(75) Inventors: Christopher Hugh Pratley; Katsuhiro Namba, both of Seattle, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,050

(22) Filed: Jun. 17, 1998

(51) Int. Cl.[7] ............................................. G06F 17/00
(52) U.S. Cl. ........................ 707/503; 707/509; 707/510
(58) Field of Search ................................ 707/503, 509, 707/510, 504, 508

(56) References Cited

U.S. PATENT DOCUMENTS

| | | | | |
|---|---|---|---|---|
| 5,379,372 A | * | 1/1995 | Wu | 707/506 |
| 5,420,695 A | * | 5/1995 | Ohta | 358/462 |
| 5,485,566 A | * | 1/1996 | Rahgozar | 707/509 |
| 5,502,777 A | * | 3/1996 | Ikemure | 382/173 |
| 5,923,018 A | * | 7/1999 | Kameda et al. | 235/385 |
| 5,933,833 A | * | 8/1999 | Musashi | 707/102 |
| 5,970,506 A | * | 10/1999 | Kiyan et al. | 707/503 |
| 6,006,240 A | * | 12/1999 | Handley | 707/510 |

OTHER PUBLICATIONS

Philip T. Cox et al. Using Visual Programming to Extend the Power of Spreadsheet Computation. Technical University of Nova Scotia. Jun. 1–4, 1994, pp. 153–161.*

* cited by examiner

*Primary Examiner*—Stephen S. Hong
(74) *Attorney, Agent, or Firm*—Merchant & Gould

(57) ABSTRACT

In an electronic document, merging cells in a table, adding an integrated header to a table, and adding a nested table to a table. A table erasing tool allows a user to merge cells in a table. An indication is received to merge certain cells. The indication indicates at least one cell border for deletion. Cells of the table are merged horizontally across each row that includes at least one indicated cell border. Cells of the table are merged vertically across each column that includes at least one indicated cell border. A determination is made whether there are any successful merges and, if so, the merging tasks are repeated until there are no further successful horizontal or vertical merges. A table drawing tool allows a user to add an integrated header row to a table or create a nested table.

10 Claims, 18 Drawing Sheets

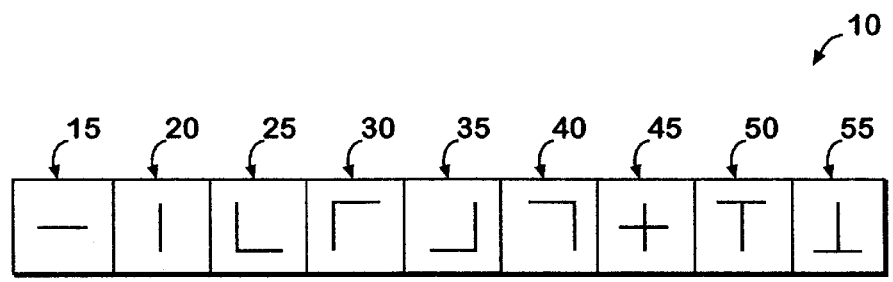
(PRIOR ART)
FIG.1
(PRIOR ART)
FIG.2

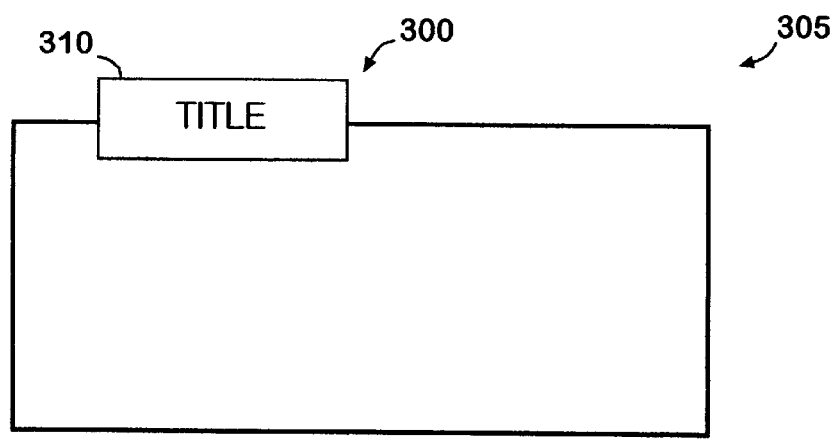
FIG.3A
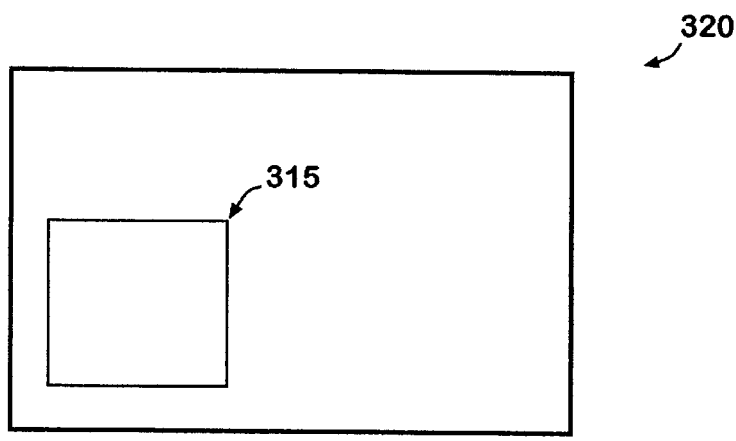
FIG.3B
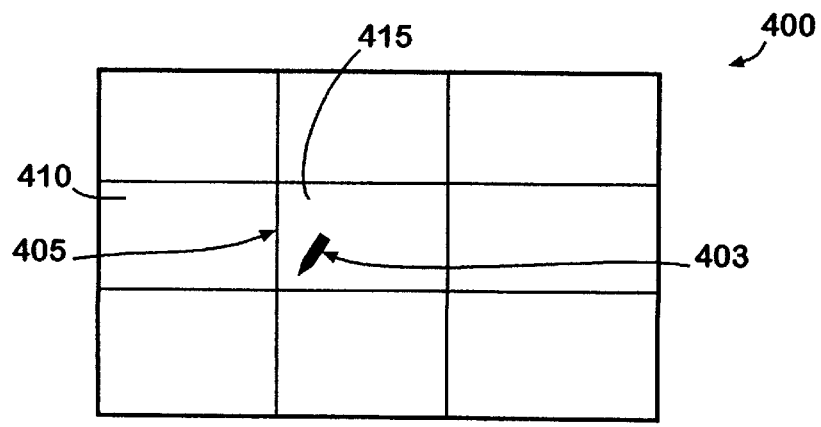
FIG.4

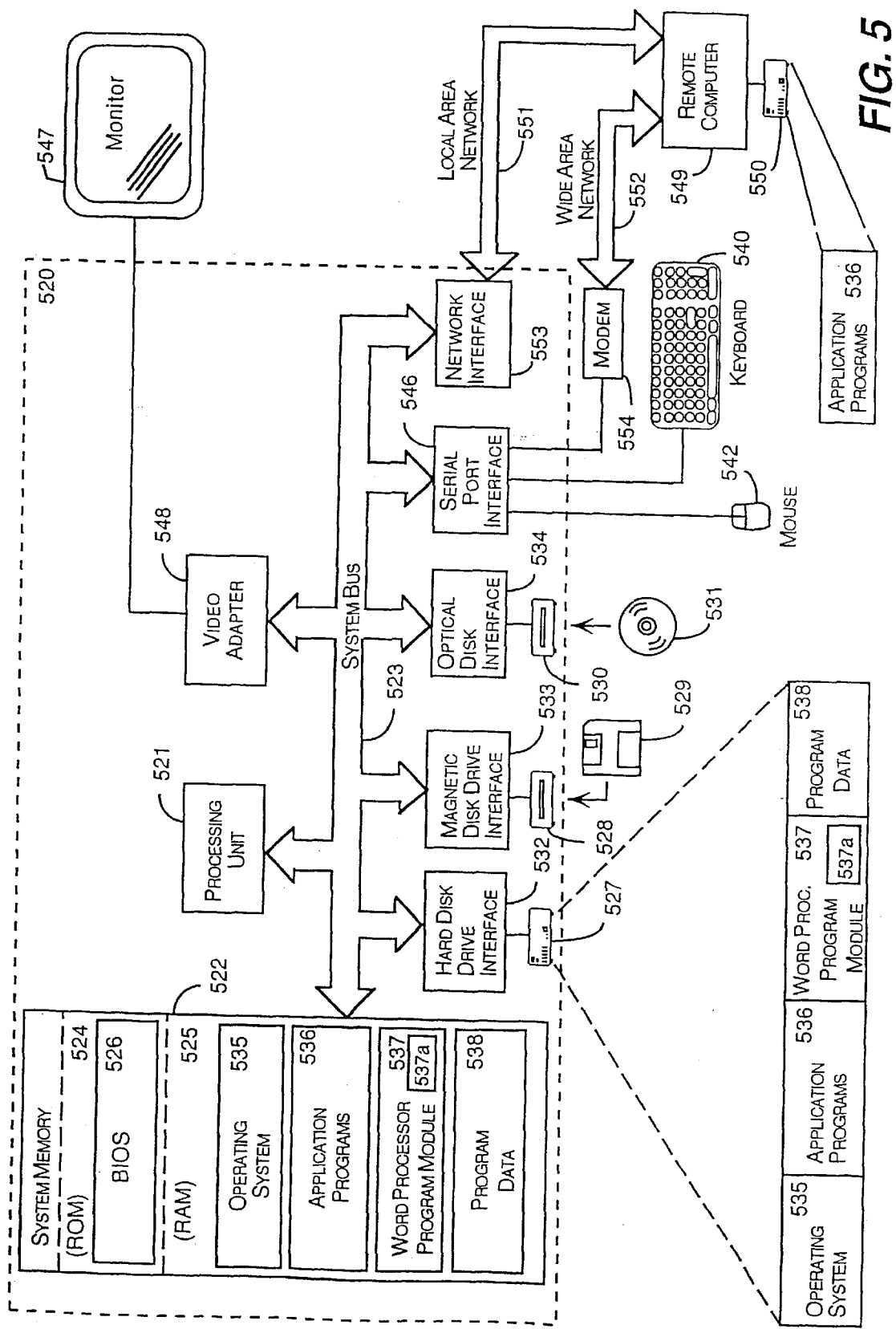
FIG. 5

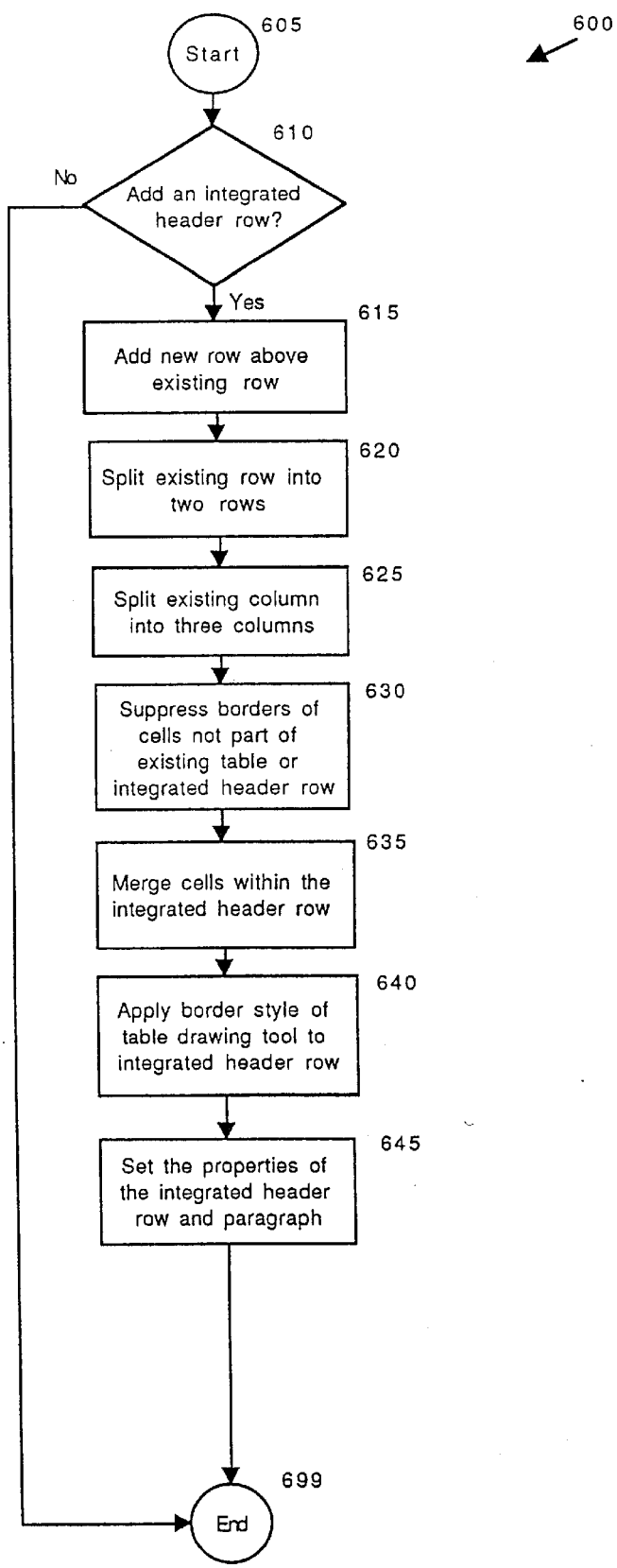
FIG. 6

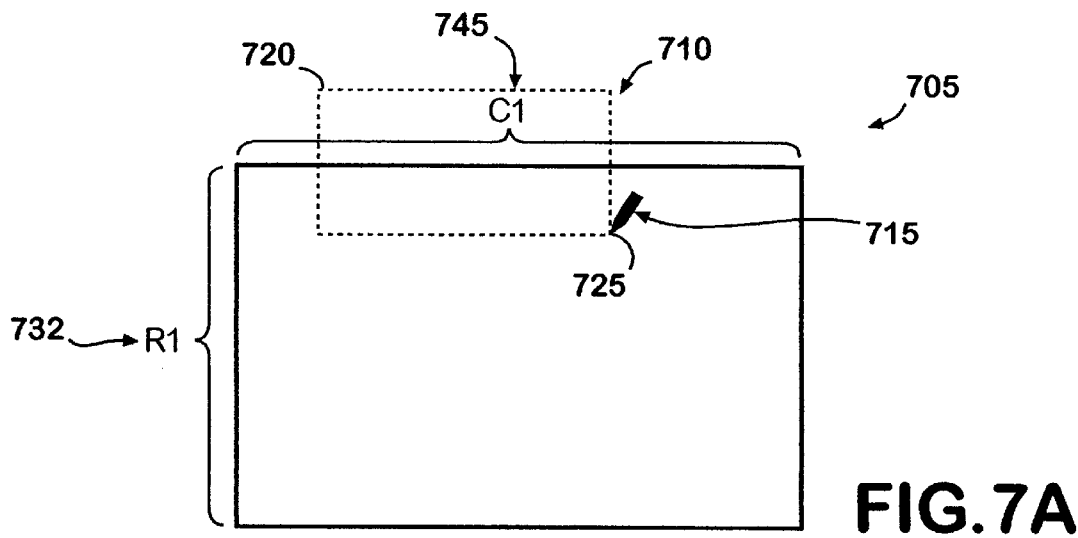
FIG.7A
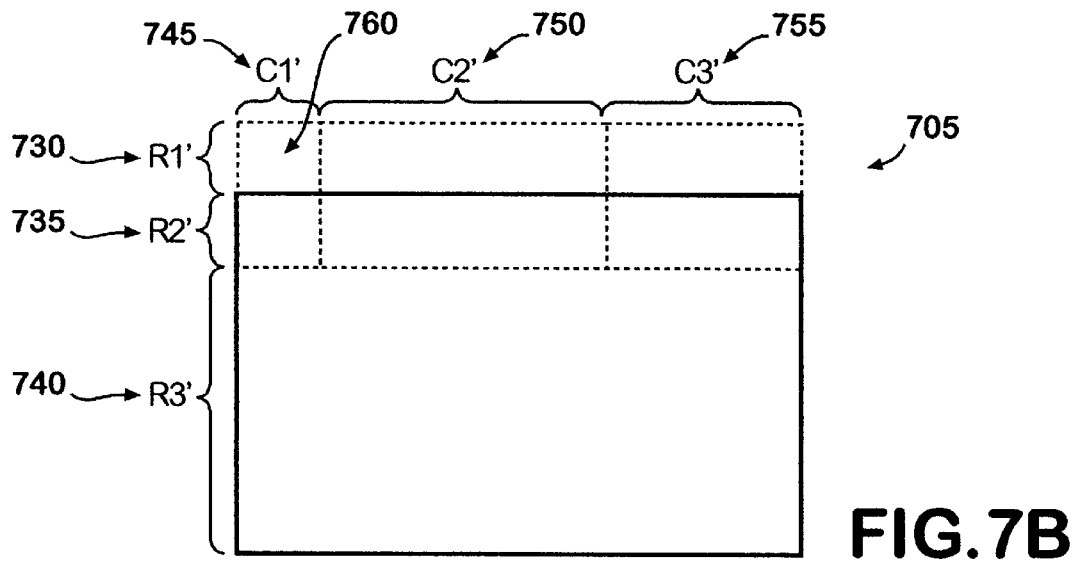
FIG.7B
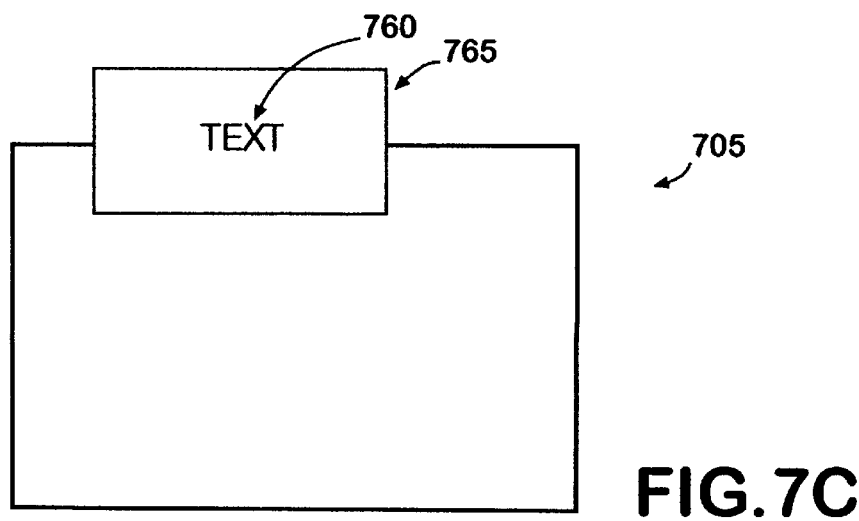
FIG.7C

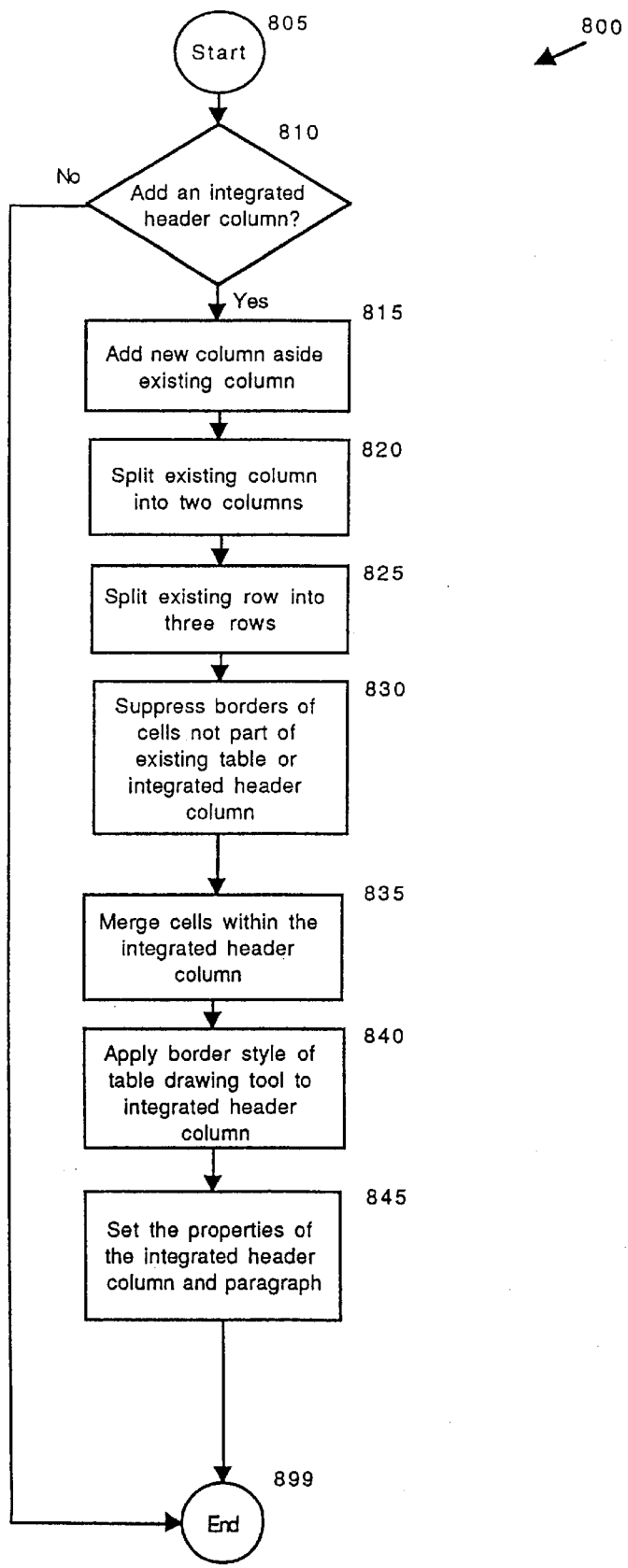
FIG. 8

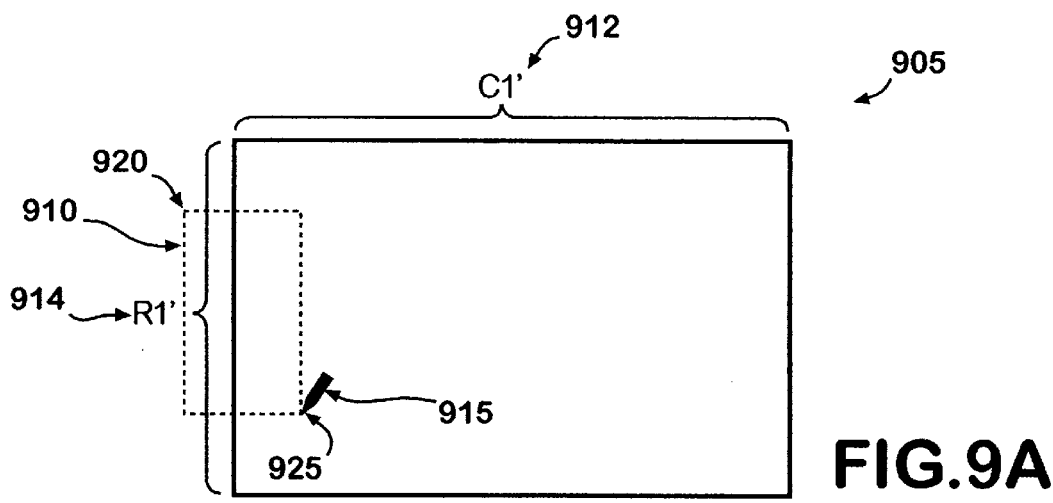
FIG. 9A
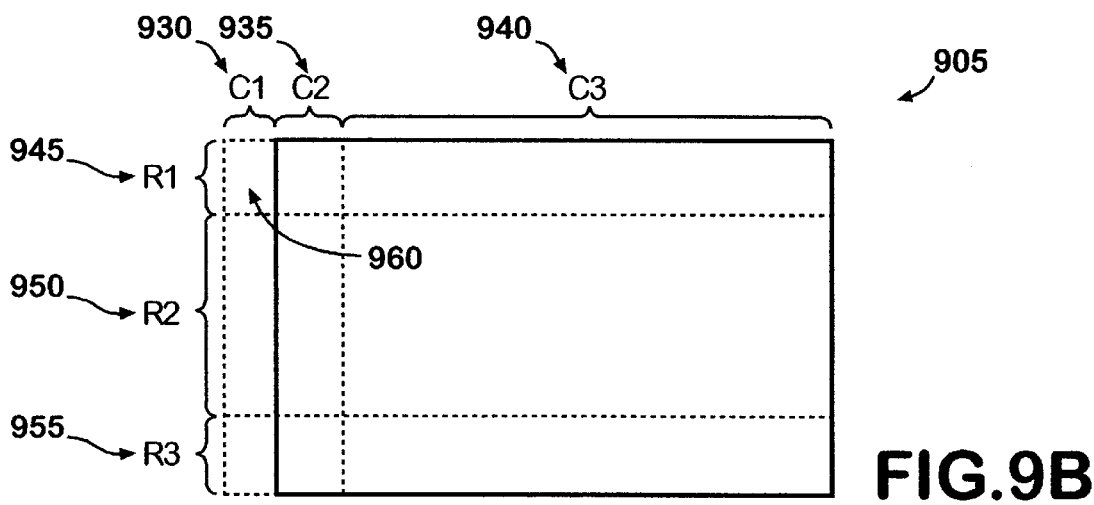
FIG. 9B
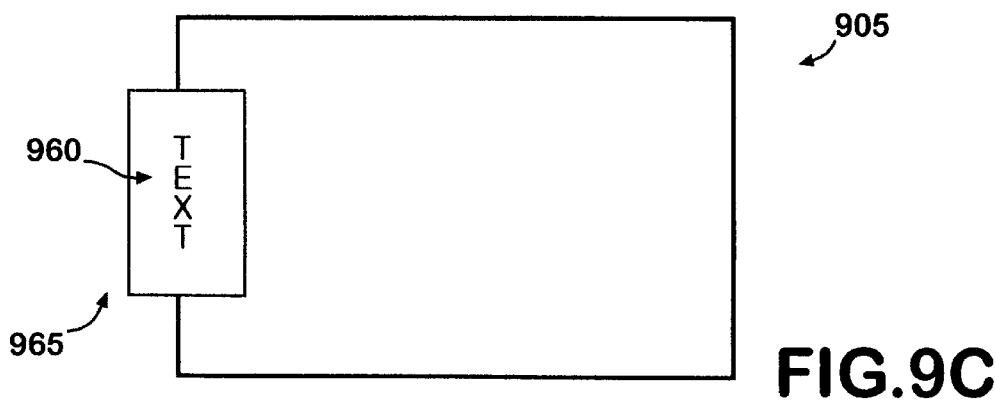
FIG. 9C

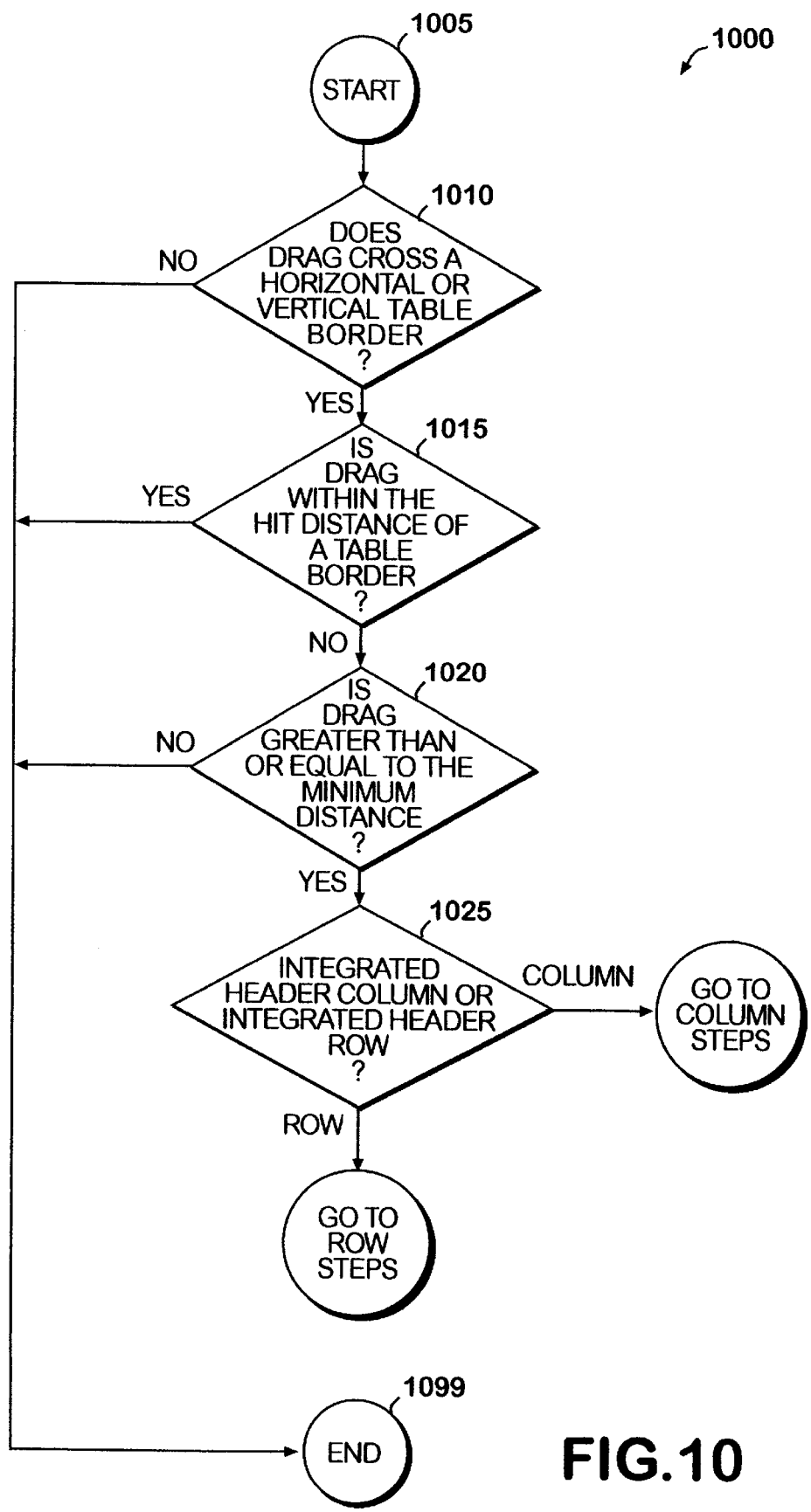
FIG.10

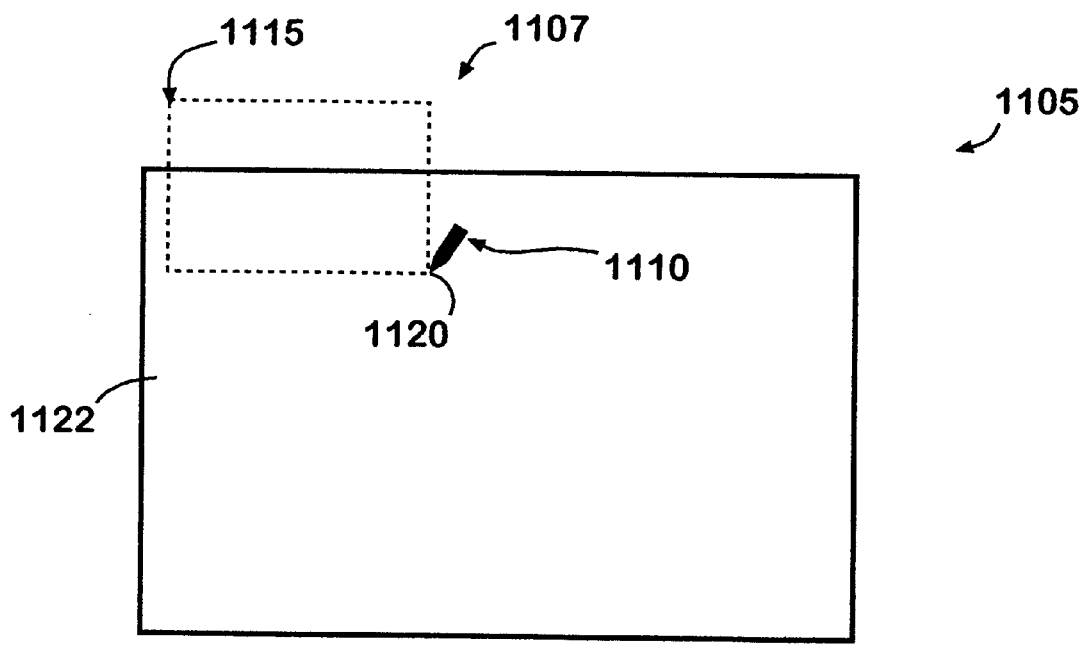
FIG.11A
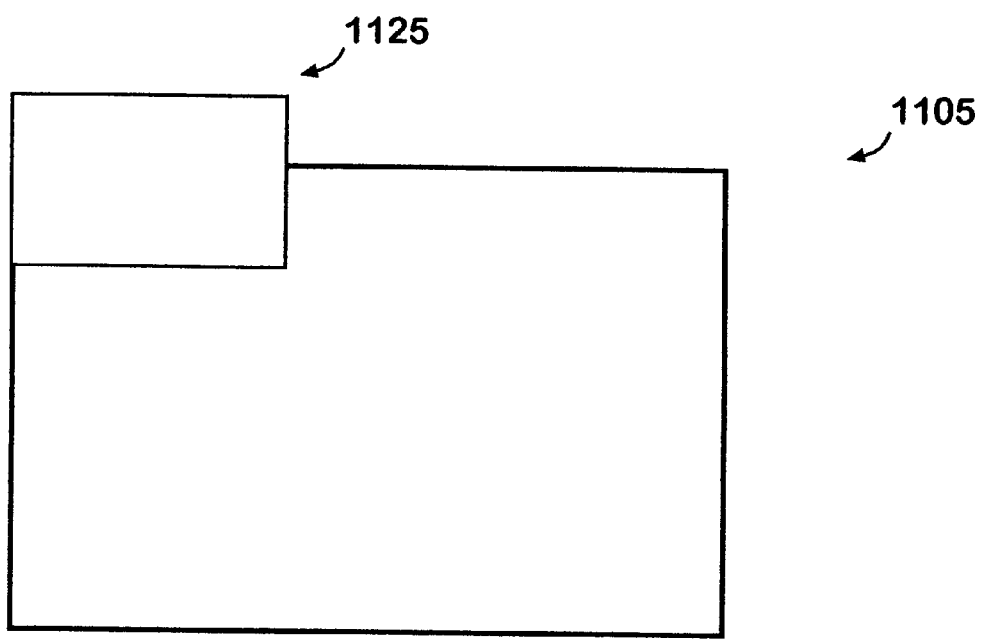
FIG.11B

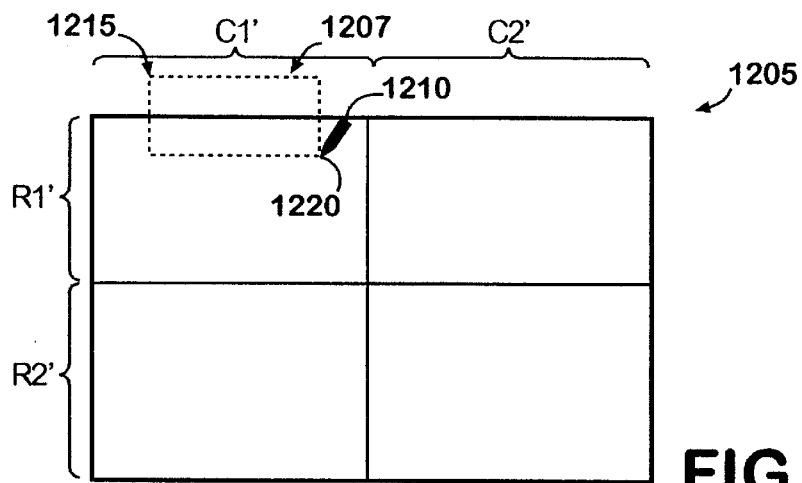
FIG.12A
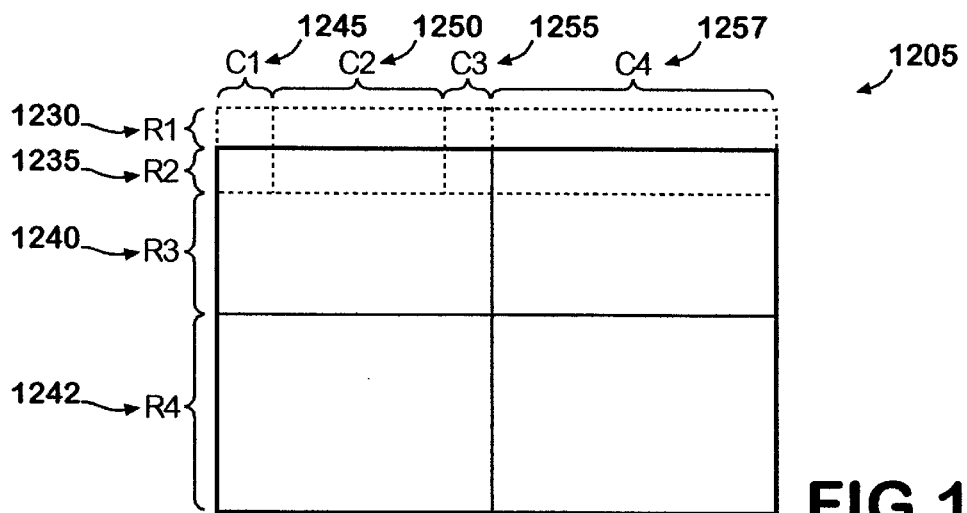
FIG.12B
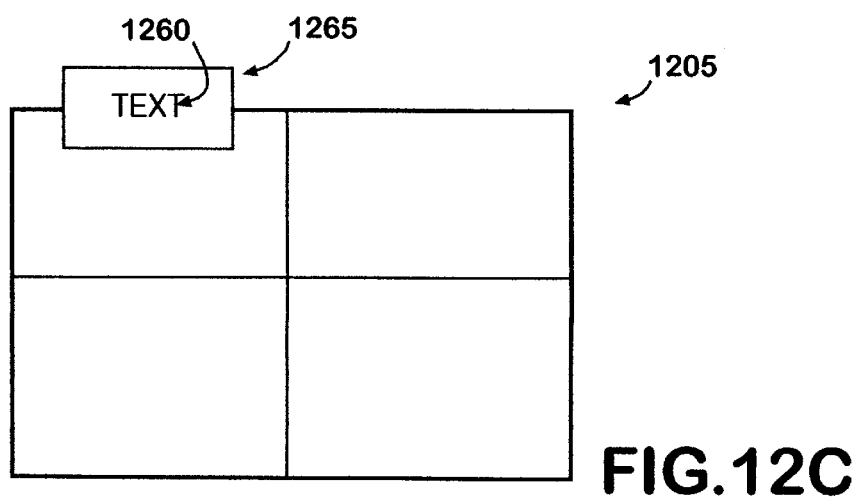
FIG.12C

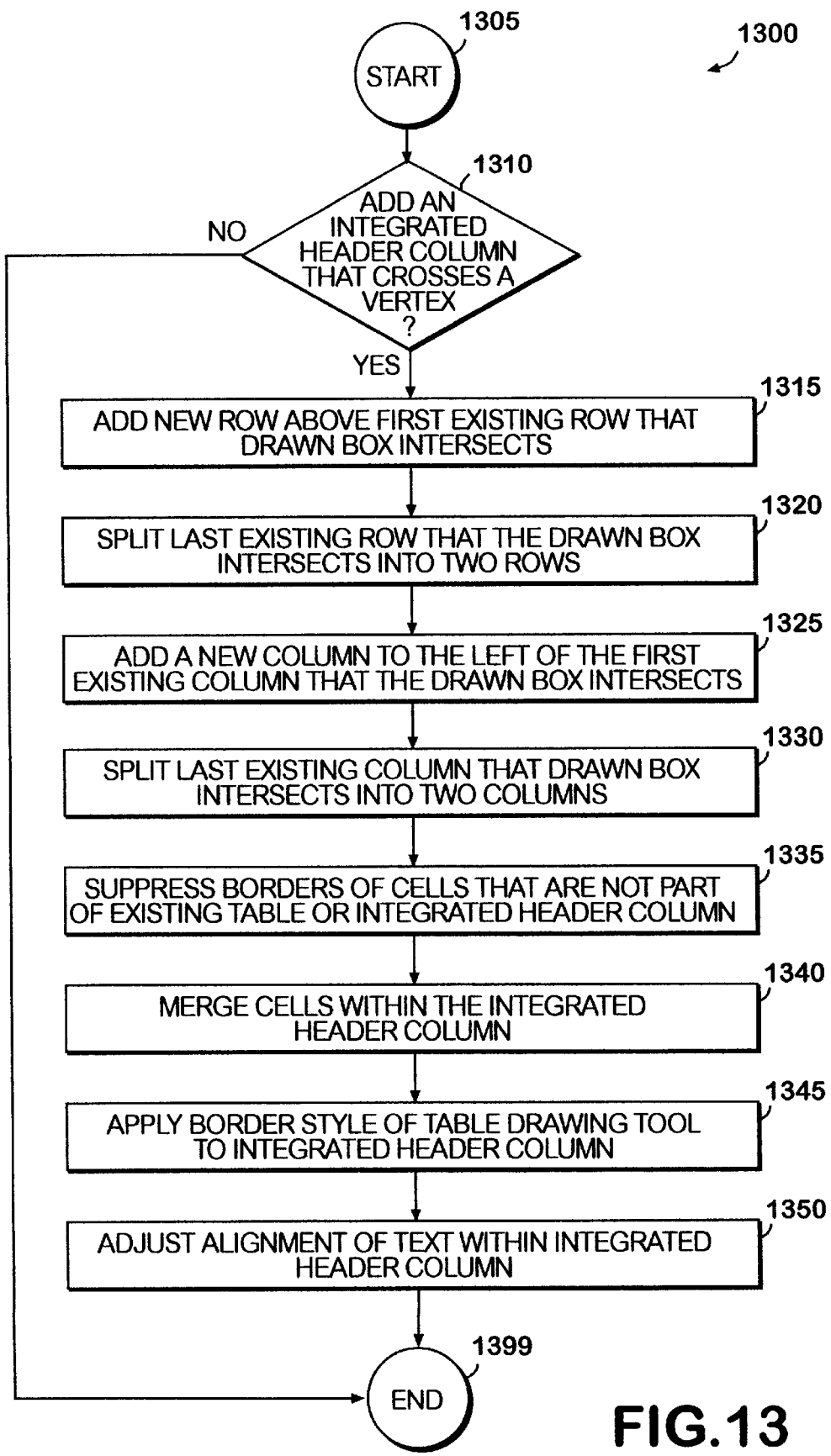
FIG.13

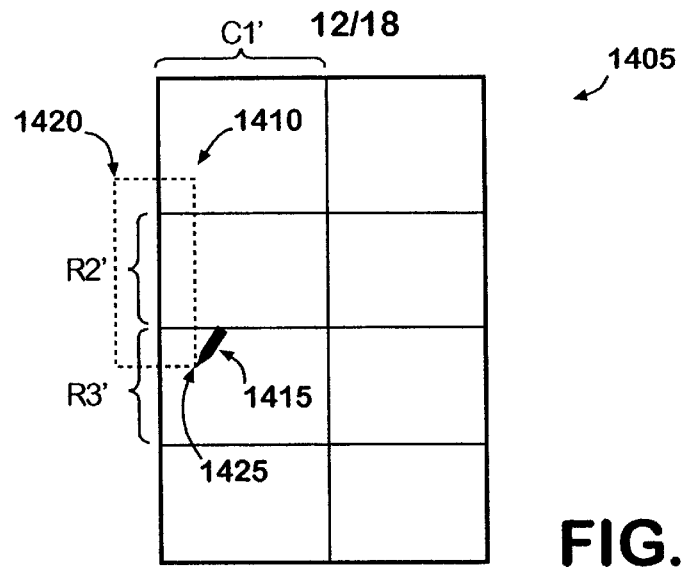
FIG. 14A
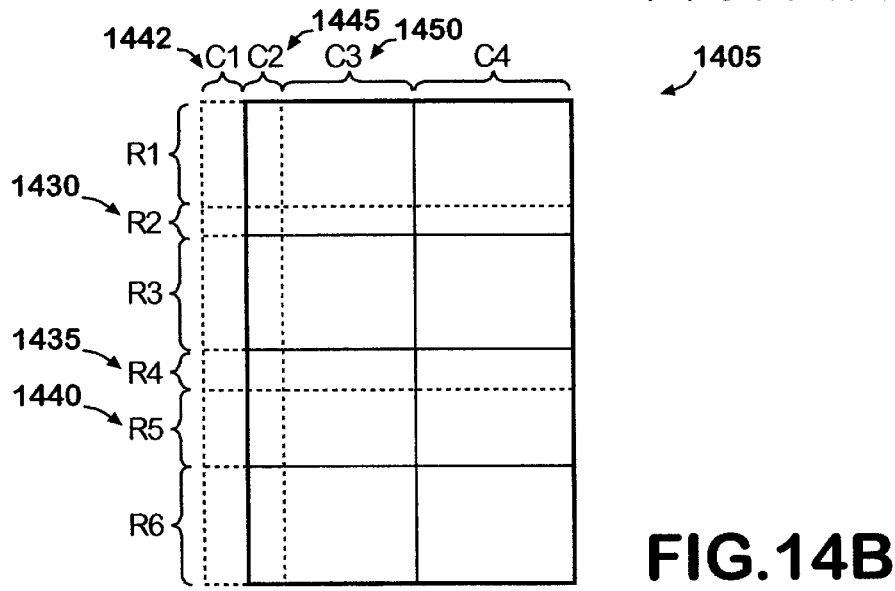
FIG. 14B
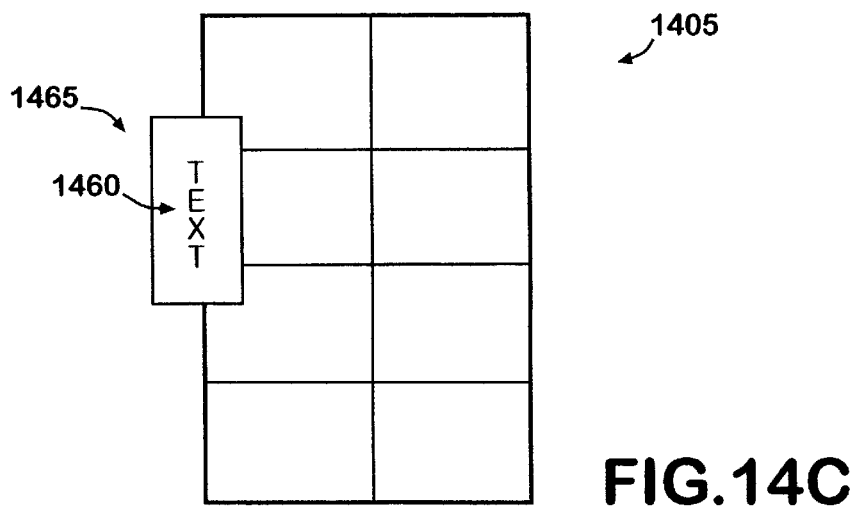
FIG. 14C

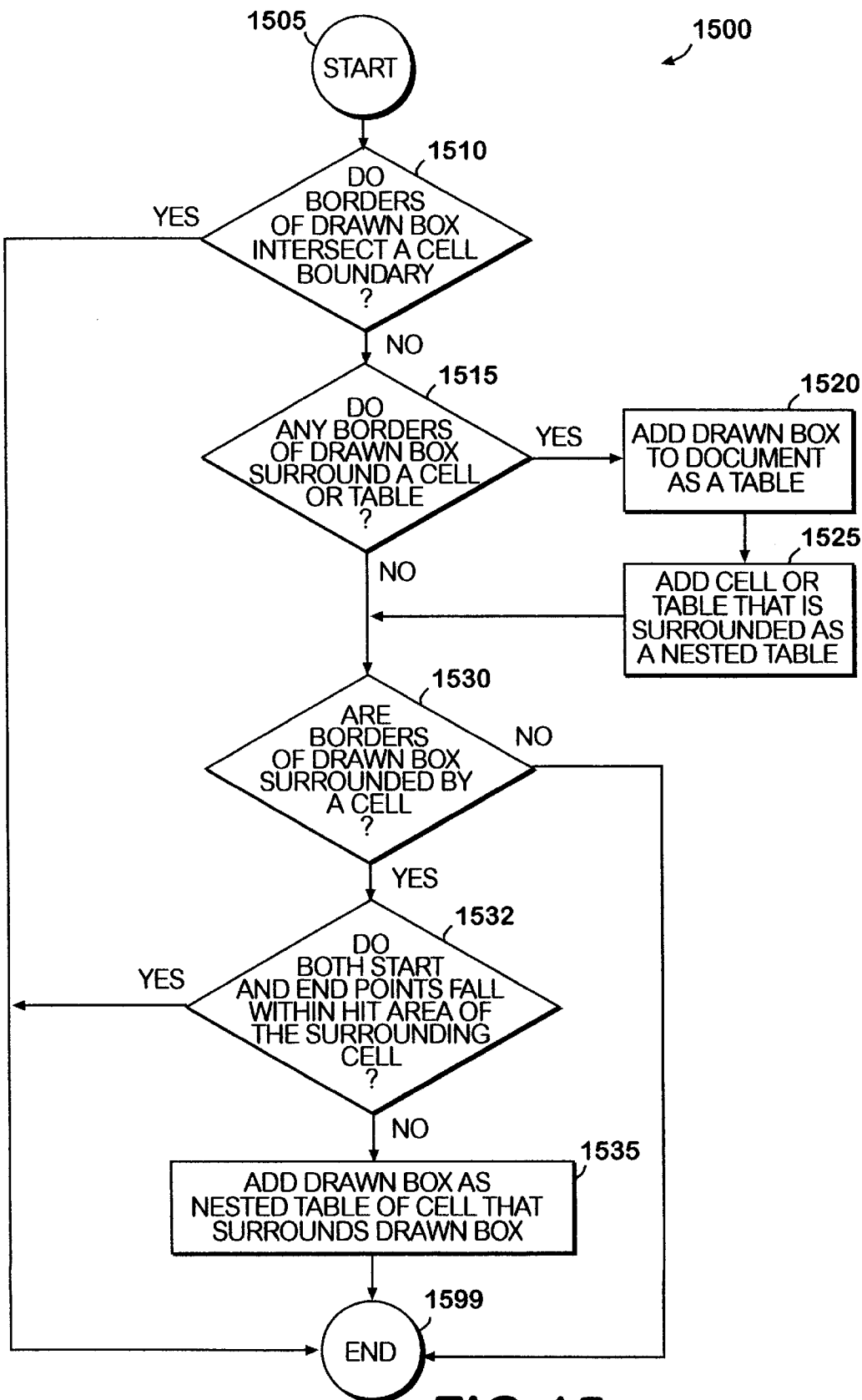
FIG.15

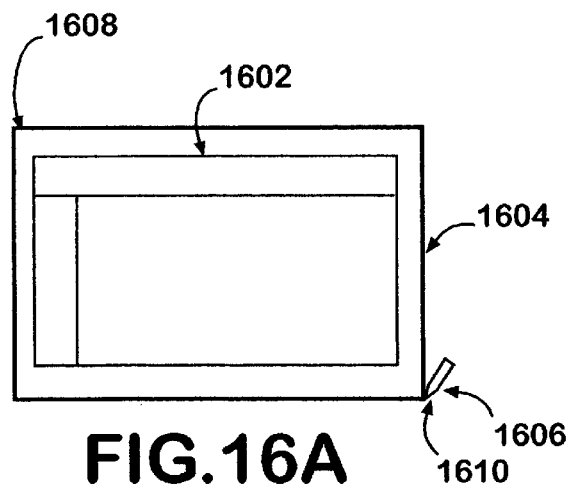
FIG.16A
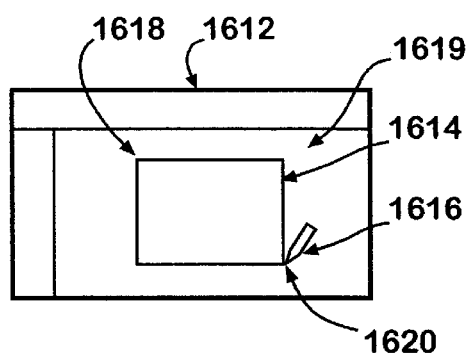
FIG.16B
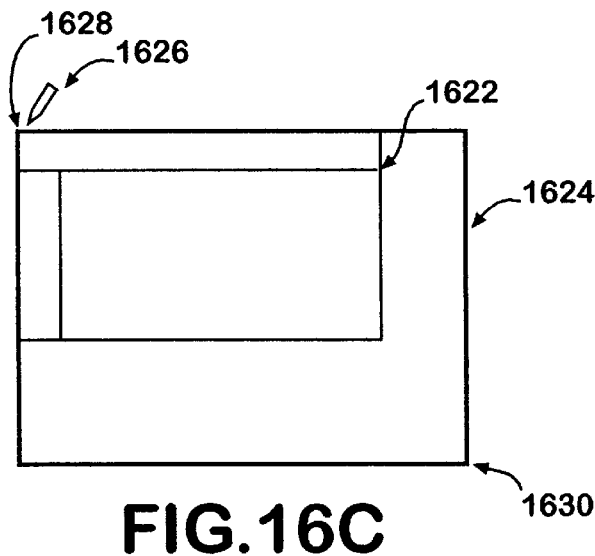
FIG.16C
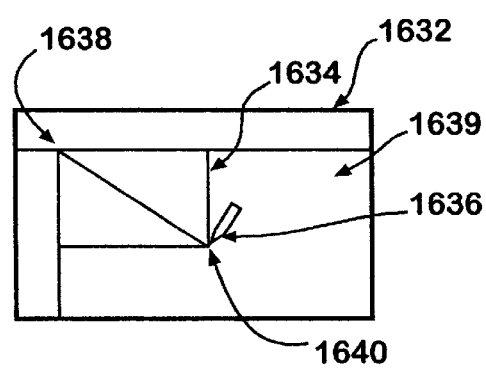
FIG.16D
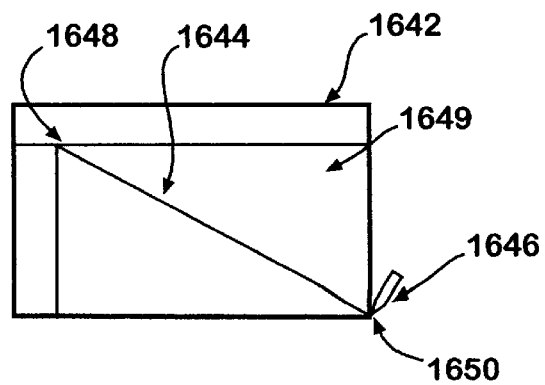
FIG.16E

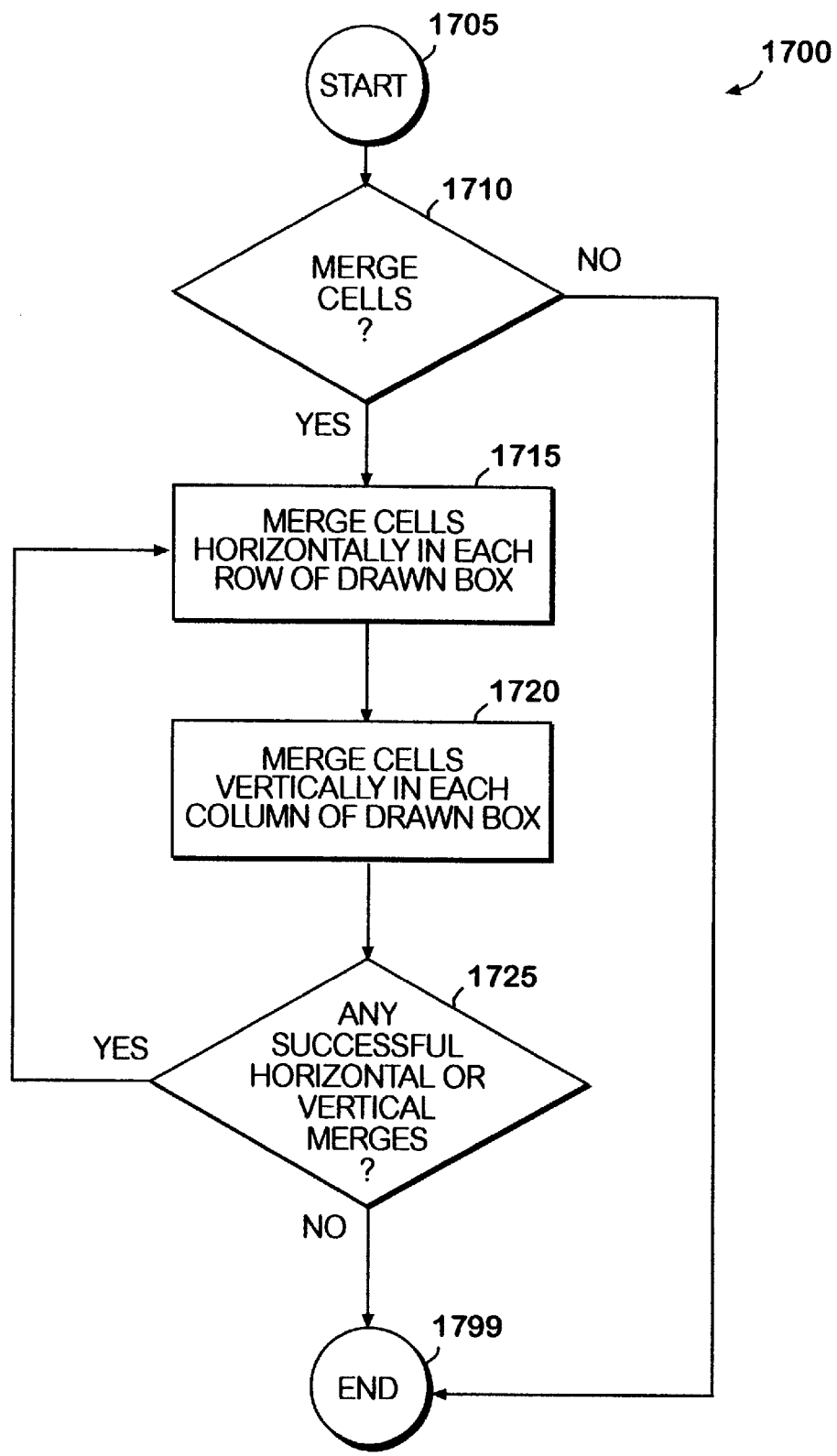
FIG.17

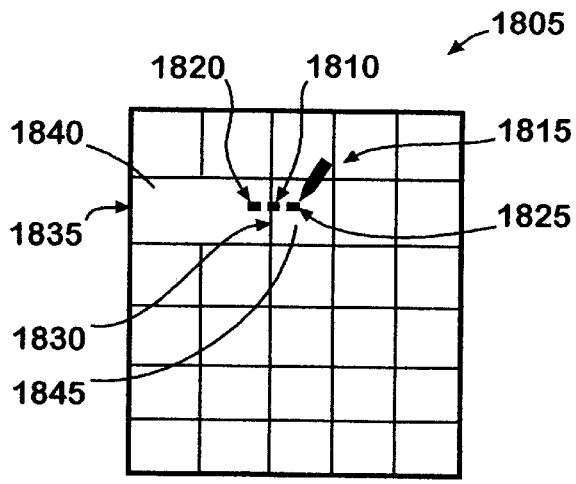
FIG.18A
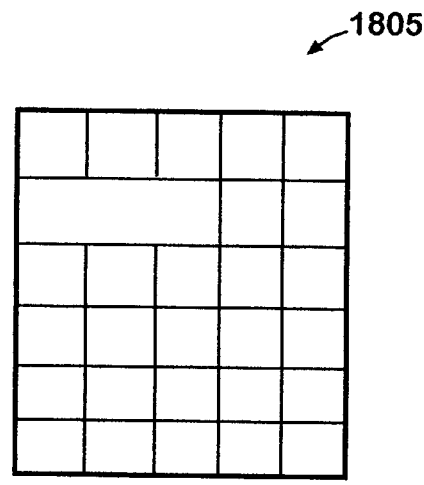
FIG.18B
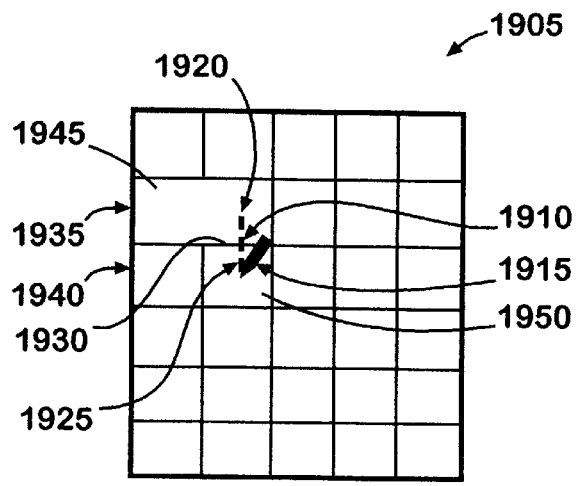
FIG.19A
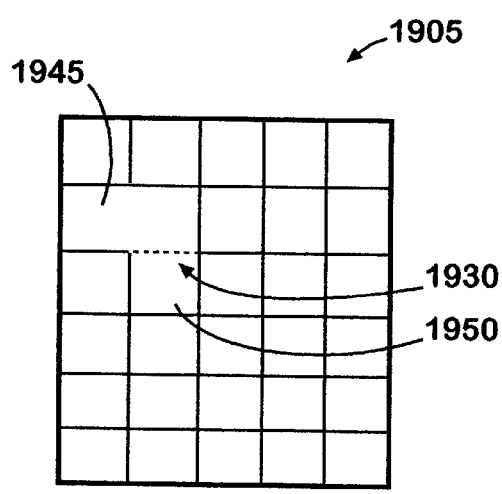
FIG.19B

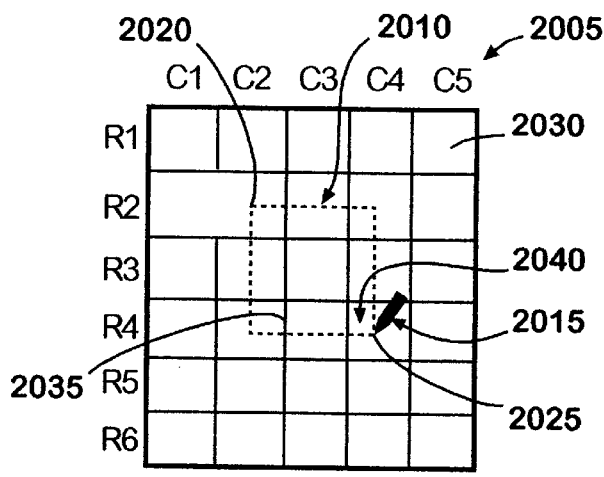
FIG.20A
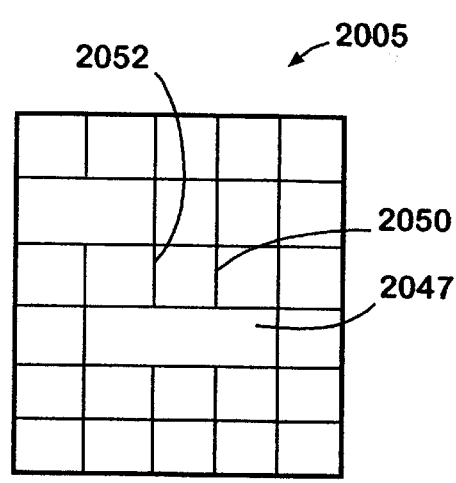
FIG.20B
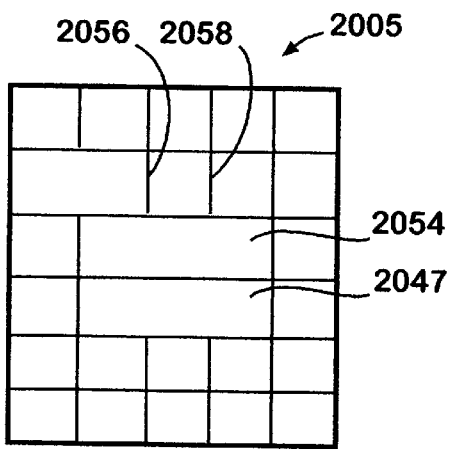
FIG.20C
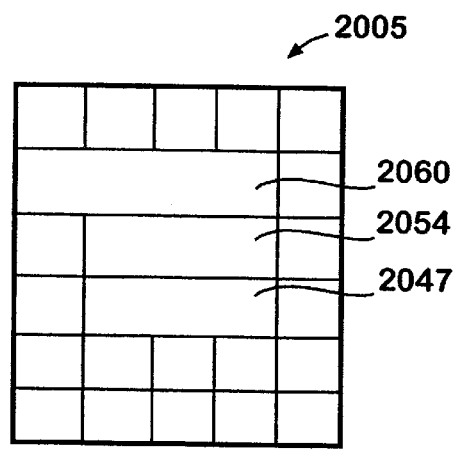
FIG.20D
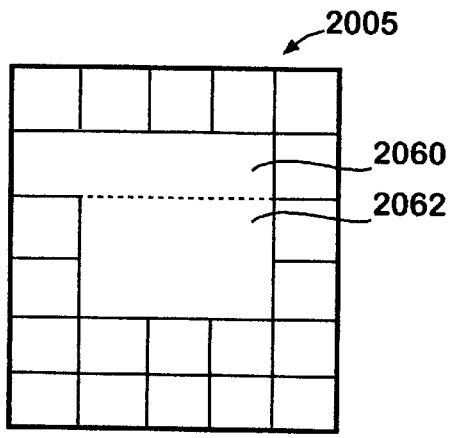
FIG.20E

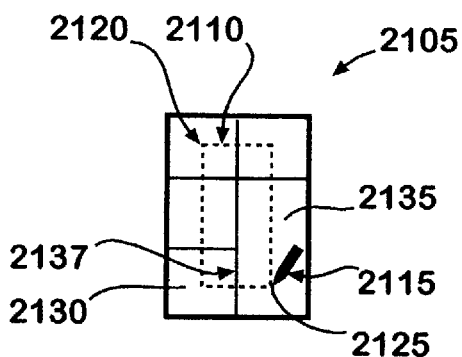
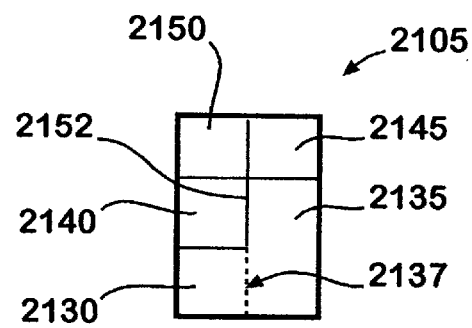
FIG.21A         FIG.21B
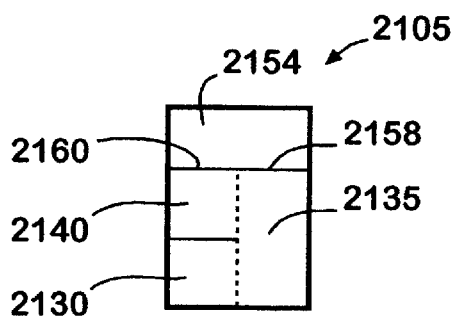
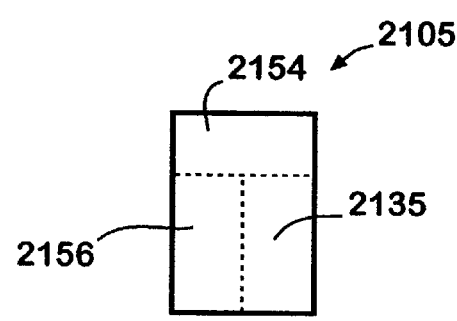
FIG.21C         FIG.21D
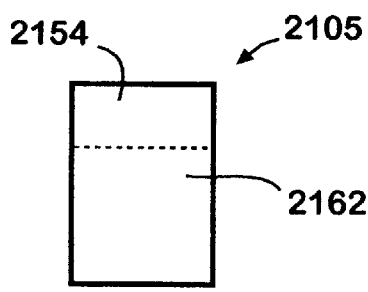
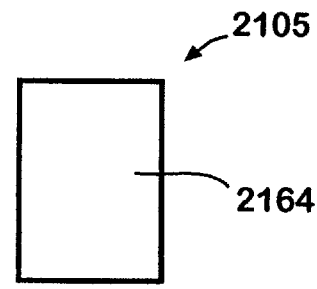
FIG.21E         FIG.21F

METHOD AND SYSTEM FOR MERGING CELLS IN A TABLE AND FOR ADDING AN INTEGRATED HEADER AND A NESTED TABLE TO A TABLE IN AN ELECTRONIC DOCUMENT

TECHNICAL FIELD

This invention relates to editing a table in an electronic document. More particularly, this invention relates to using a table tool to add an integrated header to a table, to add a nested table to a table, and to merge cells within a table.

BACKGROUND OF THE INVENTION

Use of word processing program modules has increased in recent years due in part to the flexibility and simplicity of these programs. Oftentimes, documents with tables are produced using these word processing program modules. Unfortunately, documents with tables are not as easy to produce as documents composed entirely of text. Thus, word processing program developers have tried to develop easier, simpler, and more user-friendly mechanisms for producing and editing tables in an electronic document to provide a more competitive word processing program.

In order to better understand how tables are produced and stored in an electronic document, it is helpful to review how elements of a document, in general, are produced and stored. Some word processing program modules store elements of an electronic document on a character basis. For these character-based word processing program modules, new table-forming characters may be added as characters to the word processing program module so that tables may be inserted into a document. For example, referring to FIG. 1, several different table-forming characters 10 are illustrated: a horizontal line 15, a vertical line 20, corner characters 25, 30, 35, 40, four-way junction 45, and t-junctions 50, 55. Using these table-forming characters 10, a user may construct a table of virtually any size and shape using either a keyboard or a mouse to add the table-forming characters to a document.

In early versions of program modules with table-forming characters, the addition of textual characters to a table might destroy the shape of the table since any added characters could push or move the table-forming characters and, thus, destroy the shape of the table. In later improvements, program modules were provided with some intelligence to determine whether the characters on a line constitute a table and, if so, to make certain adjustments. For example, the program may make an adjustment to switch to an over-type mode or to wrap text to the next line. Although table-forming characters provide an adequate solution for tables in word processing program modules that store elements on a character basis, some word processing program modules do not store elements of a document on a character basis. Thus, a different solution is needed to provide easy-to-use tables for these program modules.

Some word processing program modules store text as a stream of characters with paragraph marks. The paragraph marks hold formatting information for the stream of characters. Typically, in these stream-based program modules, cells in a table are composed of a series of paragraphs with special table formatting. The special table formatting may describe attributes of the cell such as the type of border of the cell, the row that the cell is in, the height of the row, whether text is displayed at the top, the middle, or the bottom of the cell, justification of text in the cell, and other attributes. Thus, although the table appears on screen as a single object, it may be stored as a series of paragraphs.

Some word processing program modules also include master cells and slave cells for tables. Typically, master cells control the formatting of slave cells. Slave cells are suppressed, i.e., their borders, contents, etc., are controlled by the master cell. Referring now to FIG. 2, a table 200 is illustrated including master cells and slave cells. In FIG. 2, the dashed lines represent lines that define cell borders, but which are not displayed on-screen. It should be understood that a row in a table typically must be the same height across the entire row. Thus, there is a need for master cells and slave cells. Cell 205 appears to the user as one large cell when it is actually composed of four cells: a master cell 210 and slave cells 215. It should also be understood that cell 217 is composed of master cell 220 and slave cells 225. Generally, all slaves cells must be calculated before the complete cells 205, 217 can be drawn because the complete cell boundaries are not known until all the slave cells have been calculated.

In some stream-based word processing program modules, a table drawing tool for drawing tables is available. Generally, a table drawing tool allows a user to insert a one-cell table by clicking down a mouse button at a point in a document. The user holds down the mouse button and drags the mouse to increase or decrease the size of the table. When the user releases the mouse button, the table is inserted into the document at the insertion point. Prior to the availability of a table drawing tool, a table was inserted into a document by selecting an insert table command from a menu.

Although using the prior art table drawing tools are more convenient than selecting an insert table command from a menu, there are problems with these prior art table drawing tools. For example, these prior art table drawing tools do not allow users to insert an integrated header into a table. An integrated header is a cell merged into the cell border of another cell. Referring now to FIG. 3A, an integrated header 300 is illustrated. The integrated header 300 is part of the table 305. The integrated header 300 may be used for any purpose, such as displaying a title 310 for the table 305. Using prior art methods, the integrated header 300 may be inserted using the table-forming characters 10 illustrated in FIG. 1. However, using these table-forming characters is time-consuming for the user. Moreover, if the integrated header 300 needs to be resized, then the table-forming characters will have to be manually adjusted accordingly by the user.

Another prior art method for forming the integrated header 300 is to manually merge and split cells in a table to form the integrated header 300. However, this process is time-consuming, difficult to master, and counterintuitive to a user's expectations. For example, the user expects to be able to use a table drawing tool to add the integrated header. However, prior art table drawing tools do not provide the capability of adding an integrated header. Thus, there is a need for an intuitive method for using a table drawing tool to quickly add an integrated header.

Another problem of the prior art table drawing tools and methods is the problem of creating nested tables. Referring now to FIG. 3B, a nested table 315 is illustrated. A nested table is typically either entirely inside another cell, or entirely surrounds another cell. Thus, a nested table is typically one table "nested" within a second table as illustrated, in FIG. 3B. The nested table 315 is nested within the table 320. Using prior art methods, the nested table 315 may be inserted into a document using the table-forming characters 10 illustrated in FIG. 1. However, using these table-forming characters is time-consuming for the user.

Moreover, if the nested table 315 needs to be resized, then the table-forming characters will have to be manually adjusted accordingly by the user.

There are prior art methods for simulating the nested table 315 by merging and removing borders, but this is not so useful because text does not flow around the nested table, and the table itself does not move in the cell with other content. However, this process is time-consuming, difficult to master, and counterintuitive to a user's expectations because the user expects to be able to use a table drawing tool to add the nested table. Thus, there is a need for an intuitive method for using a table drawing tool to quickly add a nested table.

Yet another problem of the prior art table drawing tools and methods is editing a table to merge cells or remove cell borders. Referring now to FIG. 4, a table 400 and table drawing tool 403 are illustrated. Typically, in the prior art, to remove a border, such as border 405, the table drawing tool must be moved along the border 405 until the border is highlighted to indicate that it will be removed, such as when a mouse button is released. The border 405 between cells 410 and 415 may then be removed. One problem associated with the prior art is that the table tool (eraser icon) 403 must be moved over a significant portion of border 405 before the border is highlighted for removal. This is time-consuming and counterintuitive to the user. A user typically expects to be able to erase a border by simply moving the table drawing tool across the border in a left to right or right to left motion. Thus, there is a need for an intuitive method for using a table drawing tool to remove borders.

In summary, there is a need in the art for a method and system for quickly and easily adding an integrated header to a table. There is a further need in the art for a method and system for quickly and easily adding a nested table to a table. There is still a further need for a method and system for quickly and easily removing borders from a table.

SUMMARY OF THE INVENTION

Generally described, the present invention provides a computer-implemented method for adding an integrated header row to a table, adding a nested table to a table, and merging cells in a table. A table drawing tool may be used to add an integrated header to a table or add a nested table to a table in an intuitive manner, rather than using the inefficient and non-intuitive prior art methods. A table erasing tool may be used to delete and merge cells in a table in an intuitive manner, rather than using the inefficient and non-intuitive prior art methods.

To add an integrated header row to a table, an indication is received to add an integrated header row. The table includes a first row and a first column, and the indication may include the dimensions of the integrated header row. A new row is added above the first row, which is then split forming the second and third rows in the table. In addition, the first column is split into a second column, a third column, and a fourth column. The table now includes a new first row, a second row, and a third row and a second column, a third column, and a fourth column. The borders of cells that are not part of the table or part of the integrated header row are suppressed so that they are not displayed to the user. The cells within the integrated header row are merged into a single cell. to add an integrated header column to a table in an electronic file, an indication is received to add an integrated header column, including the dimensions of the integrated header column. A second column is added aside the first column, which is then split into a third column and a fourth column. In addition, the first row is split into a second row, a third row, and a fourth row. The borders of cells that are not part of the table or part of the integrated header column are suppressed. The cells within the integrated header column are then merged into a single cell.

In one aspect, the present invention is a computer-implemented method for determining whether to add an integrated header to the table based upon a drawn box entered by a user. The table includes horizontal cell borders and vertical cell borders. A determination is made whether the drawn box intersects at least one of the horizontal cell borders or vertical cell borders. If so, then a determination is made whether the drawn box is within a predetermined hit distance of at least one of the horizontal cell borders or at least one of the vertical cell borders. The predetermined hit distance is typically five pixels. If the drawn box is not within a predetermined hit distance of at least one of the horizontal cell borders or at least one of the vertical cell borders, then a determination is made whether the drawn box is greater than or equal to a predetermined minimum distance, and if so, then an integrated header is added to the table. The predetermined minimum distance is typically twenty pixels. In another aspect, the method may include determining whether to add an integrated header column or an integrated header row to the table before the step of adding the integrated header to the table. In still another aspect, the determination of whether to add an integrated header column or an integrated header row to the table includes determining to add an integrated header row if the drawn box intersects only one horizontal cell border and determining to add an integrated header column if the drawn box intersects only one vertical cell border.

In yet another aspect, the present invention is a method for adding a nested table to a table. The table may include a number of cells with vertical cell borders and horizontal cell borders. An indication of a drawn box is received. A determination is made whether the drawn box intersects at least one of the horizontal cell borders or at least one of the vertical cell borders. If not, then a determination is made whether the drawn box surrounds the table. If the drawn box surrounds the table, then the drawn box is added as a second table, and the table is converted to a nested table of the second table.

If the drawn box does not surround the table, then a determination is made whether the drawn box is surrounded by at least one cell of the table. If so, then the drawn box is added as a nested table of the cell that surrounds the drawn box.

In another aspect, the present invention is a computer-implemented method for merging cells in a table. The table may include at least one row and at least one column and a number of cells with vertical cell borders and horizontal cell borders. An indication is received to merge cells. Typically, the indication indicates that certain cell borders should be removed, or deleted. Cells are merged horizontally across each row that includes a cell border that has been indicated for removal and cells are merged vertically across each column that includes a cell border that has been indicated for removal. The merging is repeated until no further horizontal mergers and no further vertical mergers are successful.

In one aspect, the indication to merge cells is a drawn box and the cell borders indicated for deletion are cell borders that are intersected by the drawn box or completely contained within the drawn box. The drawn box may be entered using a table erasing tool.

In one aspect, to determine whether any cells of the table need to be merged, a determination is made whether an insertion point of the drawn box is outside of a predetermined hit area of the vertical cell borders and the horizontal cell borders. If so, then a determination is made whether the drawn box crosses at least one cell border. If so, then a determination is made that the cells including at least one cell border within the drawn box and the cells intersected by the drawn box need to be merged.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIG. 1 is an illustration of several different table-forming characters.

FIG. 2 is an illustration of a table including master cells and slave cells.

FIG. 3A is an illustration of an integrated header row.

FIG. 3B is an illustration of a nested table.

FIG. 4 is an illustration of removing a cell border using a prior art table drawing tool.

FIG. 5 is a block diagram of a computer that provides the exemplary operating environment for the present invention.

FIG. 6 is a flow chart illustrating a method for adding an integrated header row.

FIGS. 7A, 7B, and 7C are illustrations of adding an integrated header row.

FIG. 8 is a flowchart illustrating a method for adding an integrated header column.

FIGS. 9A, 9B, and 9C are illustrations of adding an integrated header column.

FIG. 10 is a flowchart illustrating a method for determining whether to add an integrated header.

FIGS. 11A and 11B are illustrations of snapping an integrated header row to the side of an existing table.

FIGS. 12A, 12B, and 12C are illustrations of adding an integrated header row.

FIG. 13 is a flowchart illustrating a method for adding an integrated header column across a vertex.

FIGS. 14A, 14B, and 14C are illustrations of adding an integrated header column across a vertex.

FIG. 15 is a flowchart illustrating a method for adding a nested table to an existing table.

FIGS. 16A, 16B, 16C, 16D, and 16E are illustrations of adding a nested table to an existing table.

FIG. 17 is a flowchart illustrating a method for merging cells in a table.

FIGS. 18A, 18B, 19A, 19B, 20A, 20B, 20C, 20D, 20E, 21A, 21B, 21C, 21D, 21E, and 21F are illustrations of merging cells in a table.

DETAILED DESCRIPTION

The present invention provides a computer-implemented method for adding an integrated header to a table, for adding a nested table to a table, and for merging cells within a table. In one embodiment, the invention is incorporated into a preferred word processing application program entitled "WORD 9.0", marketed by Microsoft Corporation of Redmond, Wash. Briefly described, the preferred application program allows a user to create and edit electronic documents by entering characters, symbols, graphical objects, and commands. "WORD 9.0" stores electronic documents as a stream of characters with paragraph marks. The paragraph marks hold formatting information for the stream of characters. Typically, cells in a table are composed of a series of paragraphs with special table formatting. The special table formatting may describe attributes of the cell such as the type of border of the cell, the row that the cell is in, the height of the row, whether text is displayed at the top, the middle, or the bottom of the cell, justification of text in the cell, and other attributes.

The preferred application program also allows a user to create and edit tables using a table drawing tool and a table erasing tool. Generally described, a table drawing tool, in accordance with an embodiment of the present invention, is incorporated into the preferred application program module and allows a user to add an integrated header to a table and to add a nested table to a table. Generally described, a table erasing tool, in accordance with an embodiment of the present invention, is incorporated into the preferred application program module and allows a user to merge cells within a table, among other features.

Having briefly described an exemplary embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 5 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 5, an exemplary system for implementing the invention includes a conventional personal computer 520, including a processing unit 521, a system memory 522, and a system bus 523 that couples the system memory to the processing unit 521. The system memory 522 includes read only memory (ROM) 524 and random access memory (RAM) 525. A basic input/output system 526 (BIOS), containing the basic routines that help to transfer information between elements within the personal computer 520, such as during start-up, is stored in ROM 524. The personal computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage for the personal computer 520. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 525, including an operating system 535, one or more application programs 536, a word processor program module 537, program data 538, and other program modules (not shown). The word processor program module 537 may also include a table drawing tool and a table erasing tool program module 537a for adding tables to an electronic document and editing tables in an electronic document.

A user may enter commands and information into the personal computer 520 through a keyboard 540 and pointing device, such as a mouse 542. Other input devices (not shown) may include a microphone, joystick, game pad, satellite dish, scanner, or the like. These and other input devices are often connected to the processing unit 521 through a serial port interface 546 that is coupled to the system bus, but may be connected by other interfaces, such as a game port or a universal serial bus (USB). A monitor 547 or other type of display device is also connected to the system bus 523 via an interface, such as a video adapter 548. In addition to the monitor, personal computers typically include other peripheral output devices (not shown), such as speakers or printers.

The personal computer 520 may operate in a networked environment using logical connections to one or more remote computers, such as a remote computer 549. The remote computer 549 may be a server, a router, a peer device or other common network node, and typically includes many or all of the elements described relative to the personal computer 520, although only a memory storage device 550 has been illustrated in FIG. 5. The logical connections depicted in FIG. 5 include a local area network (LAN) 551 and a wide area network (WAN) 552. Such networking environments are commonplace in offices, enterprise-wide computer networks, intranets and the Internet.

When used in a LAN networking environment, the personal computer 520 is connected to the LAN 551 through a network interface 553. When used in a WAN networking environment, the personal computer 520 typically includes a modem 554 or other means for establishing communications over the WAN 552, such as the Internet. The modem 554, which may be internal or external, is connected to the system bus 523 via the serial port interface 546. In a networked environment, program modules depicted relative to the personal computer 520, or portions thereof, may be stored in the remote memory storage device. It will be appreciated that the network connections shown are exemplary and other means of establishing a communications link between the computers may be used.

Having described an exemplary operating environment for the present invention, embodiments of the present invention will be described below. Briefly described, the present invention provides a method and system for adding an integrated header to a table, for adding a nested table to a table, and for merging cells within a table.

Method for Adding an Integrated Header to a Table

The table drawing tool and table erasing tool program module 537a may include the capability of adding an integrated header to a table. An integrated header is a cell merged into the cell border of another cell. As described above in the Background, prior art table tools were incapable of adding an integrated header to a table.

FIG. 6 is a flow chart illustrating a method 600 for adding an integrated header row to a table in accordance with an exemplary embodiment of the present invention. Those skilled in the art will appreciate that this exemplary embodiment is a computer-implemented process that is carried out by the computer in response to input from the user and instructions provided by a program module. An integrated header row is an integrated header that crosses a horizontal cell border. An integrated header column is an integrated header that crosses a vertical cell border. The methods for adding an integrated header row and integrated header column will be described separately below because the methods may include slightly different steps.

Referring now to FIG. 6, the method 600 for adding an integrated header row begins at start step 605 and proceeds to decision step 610. It is determined whether the user wants to add an integrated header row to an existing table at decision step 610. For example, after the user draws a box with the table drawing tool, it may be determined, based upon attributes of the drawn box, that the user wants to add an integrated header row. As another example, an indication may include the dimensions of the integrated header row or column.

If it is determined that the user does not want to add an integrated header row to the existing table, then the method 600 ends at step 699. However, if it is determined that the user does want to add an integrated header row, then the method 600 proceeds to step 615.

It should be understood that, for ease of description, the existing table described in method 600 is a table that has one row and one column. However, those skilled in the art will understand the slight modifications that need to be made to method 600 for adding an integrated header to an existing table of more than one row and/or column.

Returning now to the description of method 600 and still referring to FIG. 6, a new row is added to the existing table above the existing table row. In one embodiment, the new row has a height from the top of the existing table to the top of the box drawn by the user using the table drawing tool. Due to the constraint that a row typically must span the entire width of a table, then the width of the new row added at step 615 is typically the width of the existing table.

At step 620, the existing table row is split into two rows. In one embodiment, the existing table row is split at the bottom of the drawn box. Due to the constraint that a row typically must span the entire width of a table, then the width of the split rows added at step 620 are typically the width of the existing table.

At step 625, the existing table column is split into three columns. In one embodiment, the existing table column is split at the left edge and right edge of the drawn box, resulting in three columns in place of the existing table column.

At step 630, the borders of cells that are not part of the existing table or integrated header row are suppressed so that these borders will not be drawn or printed on monitor 547. It should be understood that the borders are not only suppressed for display, the border formatting is actually not applied to those table cell edges. In other words, these borders will not be displayed to the user. The method then proceeds to step 635.

At step 635, the cells within the integrated header row are merged to form a single cell. In one embodiment, the cells within the integrated header row are the cells within the drawn box. The method then proceeds to step 640.

At step 640, the border style of the table drawing tool is applied to the outer cell borders of the integrated header row. It should be understood that typically the table drawing tool may have different styles associated with it, such as color and line style. For example, the user may select a red style to add a red integrated header row. After the border style of the table drawing tool is applied to the outer cell borders of the integrated header row at step 640, the method proceeds to step 645.

At step 645, the properties of the integrated header row and paragraph are set. It should be understood that when the integrated header row is first entered it may comprise an empty default paragraph. The properties of this paragraph are typically set at default values. For example, the default paragraph is typically centered within the integrated header row. After the properties of the integrated header row and paragraph are set at step 645, the method ends at step 699.

To demonstrate method 600, an example is provided in reference to FIGS. 7A, 7B, and 7C. Referring now to FIG. 7A, an existing table 705, a drawn box 710 and a table drawing tool 715 are illustrated. It should be understood that drawn box 710 is typically drawn using table drawing tool 715. For example, the drawn box 710 may be drawn by moving table drawing tool to insertion point 720, clicking and holding down the mouse button on mouse 542, and moving the mouse 542 to end point 725. The mouse button may then be released to add the drawn box to the existing table as an integrated header row. As shown in FIG. 7A, the drawn box 710 is represented by dashed lines to show that it has not yet been inserted into the document because the user has not released the mouse button.

Referring now to FIG. 6 and FIG. 7A, the method 600 for adding an integrated header row begins at start step 605 and proceeds to decision step 610. At decision step 610, it is determined that the user does want to add an integrated header row to the existing table 705.

Referring now to FIG. 7B, a new row R1 730 is added to the existing table 705 above the existing table row R1 732 (FIG. 7A). For ease of description, new row 730 will also be designated and referred to as row R1'. As illustrated in FIG. 7B, the new row R1' 730 has a height from the top of the existing table 705 to the top of the drawn box 710. It should also be noted that the width of the new row 730 added at step 615 is the width of the existing table 705.

At step 620, the existing table row R1 732 is split into two rows, row R2' 735 and row R3' 740. As illustrated in FIG. 7B, the existing table row 705 may be split at the bottom of the drawn box 710.

At step 625, the existing table column C1 747 is split into three columns, column C1' 745, column C2' 750, and column C3' 755. As illustrated in FIG. 7B, the existing table column C1 747 may be split at the left edge and right edge of the drawn box 710, resulting in the three columns 745, 750, and 755.

At step 630, the borders of cells that are not part of the existing table 705 or integrated header row are suppressed so that these borders will not be drawn on monitor 547. In other words, these borders will not be displayed to the user. In FIG. 7B, the cells will be referred to by their row, column numbers for ease of convenience. For example, cell 760 may be referred to as cell R1', C1'. Thus, cell R1', C1' will have its left and upper borders suppressed because these borders are not part of the existing table 705 or integrated header row. Cell R1', C2' does not have any of its borders suppressed at step 630. Cell R1', C3' has its upper and right borders suppressed at step 630. Cell R2', C1' has its bottom border suppressed at step 630. Cell R2', C2' does not have any of its borders suppressed at step 630. Cell R2', C3' has its bottom border suppressed at step 630. The method then proceeds to step 635.

At step 635, the cells within the integrated header row are merged to form a single cell. Thus, cells R1', C2' and R2', C2' are merged to form a single cell. It should be understood that the merging may take place through creation of master cells and slave cells as described above in the Background. For example, cell R1', C2' may be the master cell for slave cell R2', C2'. It should also be understood that, in the non-trivial case where there is more than 1 column, R2' and R3' are merged for every column that does not have an integrated header row. The method then proceeds to step 640.

At step 640, the border style of the table drawing tool 715 is applied to the outer border of the integrated header row composed of cells R1', C2' and R2', C2'. For example, a red border may be applied to the integrated header row. After the border style of the table drawing tool 715 is applied to the outer border of the integrated header row at step 640, the method proceeds to step 645.

Referring now to FIG. 7C, at step 645, the text 760 is aligned within the integrated header row 765, such as being centered within the integrated header row. After the alignment of the text in the integrated header row is adjusted at step 645, the method ends at step 699.

The end result displayed to the user is illustrated in FIG. 7C.

Referring now to FIG. 8, a flow chart illustrating a method 800 for adding an integrated header column to a table in accordance with an exemplary embodiment of the present invention is illustrated. Those skilled in the art will appreciate that this exemplary embodiment is a computer-implemented process that is carried out by the computer in response to input from the user and instructions provided by a program module.

The method 800 for adding an integrated header column begins at start step 805 and proceeds to decision step 810. It is determined whether the user wants to add an integrated header column to an existing table at decision step 810. For example, after the user draws a box with the table drawing tool, it may be determined, based upon the attributes of the drawn box, that the user wants to add an integrated header column.

If it is determined that the user does not want to add an integrated header column to the existing table, then the method 800 ends at step 899. However, if it is determined that the user does want to add an integrated header column, then the method 800 proceeds to step 815.

It should be understood that the existing table described in reference to method 800 is a table that has one row and one column for ease in describing method 800. However, those skilled in the art will understand the slight modifications that need to be made to method 800 to add an integrated header column to an existing table of more than one row and/or column.

Returning now to the description of method 800 and still referring to FIG. 8, a new column is added to the side of the existing table column at step 815. In one embodiment, the new column has a width from the side of the existing table to the side of the drawn box. The height of the new column added at step 815 is typically the height of the existing row.

At step 820, the existing table column is split into two columns. In one embodiment, the existing table column is split at the side of the drawn box.

At step 825, the existing table row is split into three rows. In one embodiment, the existing table row is split at the top edge and bottom edge of the drawn box, resulting in three rows in place of the existing row.

At step 830, the borders of cells that are not part of the existing table or integrated header column are suppressed so that these borders will not be drawn on monitor 547. In other words, these borders will not be displayed to the user. The method then proceeds to step 835.

At step 835, the cells within the integrated header column are merged to form a merged cell. In one embodiment, the cells within the integrated header column are the cells within the drawn box. The method then proceeds to step 840.

At step 840, the border style of the table drawing tool is applied to the outer borders of the integrated header column. It should be understood that typically the table drawing tool may have different styles associated with it, such as color and line style. For example, the user may select a red style to add a red integrated header column. After the border style of the table drawing tool is applied to the outer borders of the integrated header column at step 840, the method proceeds to step 845.

At step 845, the properties of the cell and the paragraph are set. For example, the text of the default empty paragraph is typically adjusted to flow vertically and centered within the integrated header column. After the properties of the cell and the paragraph are set at step 845, the method ends at step 899.

To demonstrate method 800, an example is provided in reference to FIGS. 9A, 9B, and 9C. Referring now to FIG. 9A, an existing table 905, a drawn box 910 and a table drawing tool 915 are illustrated. It should be understood that drawn box 910 is typically drawn using table drawing tool 915. For example, the drawn box 910 may be drawn by moving table drawing tool to insertion point 920, clicking and holding down the mouse button on mouse 542, and moving the mouse 542 to end point 925. The mouse button may then be released to add the drawn box to the existing table as an integrated header column. As shown in FIG. 9A, the drawn box 910 is represented by dashed lines to show that it has not yet been inserted into the document because the user has not released the mouse button.

Referring now to FIG. 8 and FIG. 9A, the method 800 for adding an integrated header column begins at start step 805 and proceeds to decision step 810. At decision step 810, it is determined that the user does want to add an integrated header column to the existing table 905.

Referring now to FIG. 9B, a new column 930 is added to the existing table 930 aside the existing table column. For ease of description, new column 930 will also be designated and referred to as column C1. As illustrated in FIG. 9B, the new column C1 930 has a width spanning from the side of the existing table 905 to the side of the drawn box 910. It should also be noted that the height of the new column 930 added at step 815 is the height of the existing row R1' 914. Because there is only one row, this is the height of table 905.

At step 820, the existing table column C1' 912 is split into two columns, column C2 935 and column C3 940. As illustrated in FIG. 9B, the existing table column C1' 912 may be split at the side of the drawn box 910.

At step 825, the existing table row R1' 914 is split into three rows, row R1 945, row R2 950, and row R3 955. As illustrated in FIG. 9B, the existing table row R1' 914 may be split at the top edge and bottom edge of the drawn box 910, resulting in the three rows 945, 950, and 955.

At step 830, the borders of cells that are not part of the existing table 905 or integrated header column are sup-pressed so that these borders will not be drawn on monitor 547. In other words, these borders will not be displayed to the user. In FIG. 9B, the cells will be referred to by their row, column numbers for ease of description. For example, cell 960 may be referred to as cell R1, C1. Thus, cell R1, C1 will have its left and upper border suppressed because these borders are not part of the existing table 905 or integrated header column. Cell R1, C2 has its right border suppressed at step 830. Cell R1, C3 has its left and bottom borders suppressed at step 830. Cells R2, C1 and R2, C2 do not have any of their borders suppressed at step 830. Cell R2, C3 does not have its top and bottom border suppressed at step 830 because it will be merged out of existence shortly. Cell R3, C1 has its left and bottom borders suppressed at step 830. Cell R3, C2 has its right border suppressed at step 830. Cell R3, C3 has its left and top borders suppressed at step 830. It should also be understood that at step 830 Cell R1, C3, cell R2, C3 and cell R3, C3 are merged. It should be understood that rows extend across an entire table, so if there are multiple columns in a table, the merging must continue in each column because an added row extends across the length of the table. The method then proceeds to step 835.

At step 835, the cells within the integrated header column are merged to form a merged cell. Thus, cells R2, C1 and R2, C2 are merged to form a merged cell. It should be understood that the merging may take place through creation of master cells and slave cells as described above in the Background. For example, cell R2, C1 may be the master cell for slave cell R2, C2. The method then proceeds to step 840.

At step 840, the border style of the table drawing tool 915 is applied to the outer borders of the integrated header column composed of cells R2, C1 and R2, C2. For example, a red border may be applied to the integrated header column. After the border style of the table drawing tool 915 is applied to the outer borders of the integrated header column at step 840, the method proceeds to step 845.

Referring now to FIG. 9C, at step 845, the text 960 is aligned within the integrated header row 965. For example, the text flow is converted to vertical text flow and the text is centered within the integrated header column. After the properties of the integrated header column and the paragraph are set at step 845, the method ends at step 899.

The end result displayed to the user is illustrated in FIG. 9C.

Referring now to FIG. 10, a flow chart illustrating a method 1000 for determining whether a user wants to add an integrated header to a table in accordance with an exemplary embodiment of the present invention is illustrated. Those skilled in the art will appreciate that this exemplary embodiment is a computer-implemented process that is carried out by the computer in response to input from the user and instructions provided by a program module.

The method 1000 begins at start step 1005 and proceeds to decision step 1010, when a user moves the table drawing tool from an insertion point to an end point, such as by dragging mouse 542. It is determined whether the drag, or drawn box, crosses at least one horizontal or vertical border of an existing table at decision step 1010. If not, then the method 1000 ends at step 1099. However, if the drag does cross at least one horizontal or vertical border of an existing table, then the method proceeds to decision step 1015.

At decision step 1015, it is determined whether the drag is within the hit distance of a table border. The hit distance is an area within a number of pixels of a cell border. For example, the hit distance is typically 5 pixels on either side of a cell border. If the drag is within the hit distance of a cell border, then the method ends at step 1099. This is typically because when a user begins or ends a drag within the hit distance of a table border, the user is not trying to add an integrated header, but instead is trying to perform another function such as adding a cell to a table. However, if, at decision step 1015, it is determined that the drag is outside the hit distance of a table border, then the method proceeds to decision step 1020.

At decision step 1020, it is determined whether the drag is greater than a minimum distance. The minimum distance is a number of pixels that a drag must be before it will be considered a drag rather than simply a click of the mouse button. For example, the minimum distance is typically 20 pixels. If the drag is not greater than the minimum distance, then the method ends at step 1099. This is typically because when a user enters a drag less than the minimum distance, the user is not trying to add an integrated header, but instead is trying to perform another function with the table drawing tool. However, if, at decision step 1020, it is determined that the drag is greater than or equal to the minimum distance, then the method proceeds to decision step 1025.

At decision step 1025, it is determined whether the drag indicates that the user wants to enter an integrated header row or integrated header column. If the drag indicates that the user wants to enter an integrated header row, then the method proceeds to steps to add an integrated header row, such as those described in connection with FIG. 6. However, if the drag indicates that the user wants to enter an integrated header column, then the method 1000 proceeds to steps to add an integrated header column, such as those described in connection with FIG. 8. For example, in one embodiment, if the drag, or drawn box, crosses only one horizontal cell border, then the drag is an integrated header row, whereas if the drag crosses only one vertical cell border, then the drag is an integrated header column.

Referring now to FIGS. 11A and 11B, a special case of adding an integrated header row will be described. In an embodiment of the present invention, an integrated header row may be snapped to the edge of an existing table if the insertion point or end point of a drag is horizontally within the hit area of a cell border, even though the insertion point and end point are not within the hit area.

For example, a drawn box 1107 has been drawn on existing table 1105 using table drawing tool 1110. The drawn box 1107 begins at insertion point 1115 and ends at end point 1120. As illustrated in FIG. 11A, the insertion point and end point are not within the hit area of the borders of the existing table 1105. However, the insertion point 1115 of the drag is horizontally within the hit area of the left border 1122 of the existing table 1105. Thus, the left edge of the integrated header row is snapped to the left edge of the existing table. In other words, referring now to FIG. 7B, column C1' may be eliminated or set equal to zero in this embodiment. Thus, the end result displayed to the user is illustrated in FIG. 11B with the left edge of integrated header row 1125 snapped to the left border of existing table 1105. This is typically the result the user expects when drawing an integrated header row that begins or ends within the hit distance of a left or right border of an existing table. It should be understood that a similar embodiment for integrated header columns may be implemented by those skilled in the art.

Referring now to FIGS. 12A, 12B, and 12C, an example of adding an integrated header row to an existing table with more than one row and more than one column will be described. As illustrated in FIG. 12A, existing table 1205 includes two rows (rows R1' and R2') and two columns (columns C1' and C2'). Box 1207 is drawn with table drawing tool 1210 by moving the table drawing tool from insertion point 1215 to end point 1220.

It should be understood that steps similar to those described in reference to FIG. 6 are performed to add the integrated header row to existing table 1205. Referring now to FIG. 12B, a new row 1230 is added to the existing table 1205 above row R1', in which the drawn box was entered. For ease of description, new row 1230 will also be designated and referred to as row R1. As illustrated in FIG. 12B, the new row R1 1230 has a height from the row R1' of the existing table 1205 in which the drawn box was entered to the top of the drawn box 1207. It should also be noted that the width of the newly added row 1230 is the width of the existing table 1205.

The row R1' of the existing table in which the drawn box was entered is split into two rows, row R2 1235 and row R3 1240. As illustrated in FIG. 12B, the row R1' of existing table 1205 in which the drawn box was entered may be split at the bottom of the drawn box 1207. Row R4 1242 is unaltered because the drawn box 1207 was not entered into this row.

The existing column C1' of the existing table 1205, in which the drawn box 1207 is entered, is split into three columns, column C1 1245, column C2 1250, and column C3 1255. As illustrated in FIG. 12B, the existing column C1' in which the drawn box was entered may be split at the left edge and right edge of the drawn box 1207, resulting in three columns 1245, 1250, and 1255.

The borders of cells that are not part of the existing table 1205 or the integrated header row are suppressed so that these borders will not be drawn on monitor 547. The cells within the integrated header row are merged to form a single cell. Thus, cells R1, C2 and R2, C2 are merged to form a single cell. It should be understood that the merging may take place through creation of master cells and slave cells as described above in the Background. For example, cell R1, C2 may be the master cell for slave cell R2, C2.

It is also important to note that another merger takes place of cells R2, C4 and R3, C4.

The border style of the table drawing tool 1210 is applied to the outer borders of the integrated header row composed of R1, C2 and R2, C2. The text 1260 is aligned within he integrated header row 1265, such as being centered within the integrated header row. The end result displayed to the user is illustrated in FIG. 12C.

It should be understood that, up until this point, integrated headers that cross a vertex, i.e., an intersection of a vertical and horizontal line, have not been discussed. Referring now to FIG. 13, the method 1300 for adding an integrated header column that crosses a vertex of an existing table begins at start step 1305 and proceeds to decision step 1310. It is determined whether the user wants to add an integrated header column to an existing table at decision step 1310. For example, after the user draws a box with the table drawing tool, it may be determined, based upon the attributes of the drawn box, that the user wants to add an integrated header column that crosses a vertex of an existing table.

If it is determined that the user does not want to add an integrated header column that crosses a vertex of an existing table, then the method 1300 ends at step 1399. However, if it is determined that the user does want to add an integrated header column that crosses a vertex of an existing table, then the method 1300 proceeds to step 1315.

At step 1315, a new row is added to the existing table above the first row in the existing table that the drawn box intersects. In one embodiment, the new row has a height from the top of the first row in the existing table that the drawn box intersects to the top of the drawn box. Due to the constraint that a row typically must span the entire width of a table, then the width of the new row added at step 1315 is typically the width of the existing table.

At step 1320, the last existing table row that the drawn box intersects is split into two rows. In one embodiment, the existing row is split at the bottom of the drawn box. Due to the constraint that a row typically must span the entire width of a table, then the width of the split rows added at step 1320 are typically the width of the existing table.

At step 1325, a new column is added to the left of the first existing table column that the drawn box intersects. The method then proceeds to step 1330.

At step 1330, the last existing table column that the drawn table intersects is split into two columns. In one embodiment, the existing table column is split at the right edge of the drawn box.

At step 1335, the borders of cells that are not part of the existing table or part of the integrated header column are suppressed, so that these borders will not be drawn on monitor 547. In other words, these borders will not be displayed to the user. The method then proceeds to step 1340.

At step 1340, the cells within the integrated header column are merged to form a single cell. In one embodiment, the cells within the integrated header column are the cells within the drawn box. It should be understood that other cells within the table may be merged so that the overall appearance of the existing table and its content is maintained. The method then proceeds to step 1345.

At step 1345, the border style of the table drawing tool is applied to the outer borders of the integrated header column. After the border style of the table drawing tool is applied to the outer borders of the integrated header column at step 1345, the method proceeds to step 1350.

At step 1350, the alignment of the text in the integrated header column is adjusted. It should be understood that there is typically text in the integrated header column because a default blank paragraph is inserted. The paragraph is typically converted to a vertical text flow and centered within the integrated header column. After the alignment of the text in the integrated header column is adjusted at step 1350, the method ends at step 1399.

To demonstrate method 1300, an example is provided in reference to FIGS. 14A, 14B, and 14C. Referring now to FIG. 14A, an existing table 1405, a drawn box 1410 and a table drawing tool 1415 are illustrated. It should be understood that drawn box 1410 is typically drawn using table drawing tool 1415. For example, the drawn box 1410 may be drawn by moving table drawing tool to insertion point 1420, clicking and holding down the mouse button on mouse 542, and moving the mouse 542 to end point 1425. The mouse button may then be released to add the drawn box to the existing table. As shown in FIG. 14A, the drawn box 1410 is represented by dashed lines to show that it has not been inserted into the document yet because the user has not released the mouse button.

Referring now to FIG. 13 and FIG. 14A, the method 1300 for adding an integrated header column across a vertex of an existing table begins at start step 1305 and proceeds to decision step 1310. At decision step 1310, it is determined that the user does want to add an integrated header column across a vertex of the existing table 1405.

Referring now to FIG. 14B, a new row 1430 is added to the existing table 1405 above the first row R2' in the existing table that the drawn box intersects. For ease of description, new row 1430 will also be designated and referred to as row R2. As illustrated in FIG. 14B, the new row R2 1430 has a height from the first row in the existing table that the drawn box intersects, row R2', to the top of the drawn box 1410. It should also be noted that the length of the new row 1430 added at step 1315 is the width of the existing table 1405.

At step 1320, the last existing row of the existing table that the drawn box intersects, row R3', is split into two rows, row R4 1435 and row R5 1440. As illustrated in FIG. 14B, the last existing row, R3', of the existing table 1405 that the drawn box intersects, may be split at the bottom of the drawn box 1410.

At step 1325, a new column C1 1442 is added to the left of the first existing column C1' that the drawn box 1410 intersects.

At step 1330, the last existing column C1' that the drawn box 1410 intersects is split into two columns, column C2 1445 and column C3 1450. As illustrated in FIG. 14B, the last existing column that the drawn box 1410 intersects may be split at the edge of the drawn box 1410 resulting in columns 1445 and 1450.

At step 1335, the borders of cells that are not part of the existing table 1405 or integrated header row are suppressed so that these borders will not be drawn on monitor 547.

At step 1340, the cells within the integrated header column are merged to form a merged cell. Other cells may also be merged so that the general overall look of existing table 1405 is maintained. For example, cells R1, C4 and R2, C4, may be merged into a single cell. The method then proceeds to step 1345.

At step 1345, the border style of the table drawing tool 1415 is applied to the outer border of the integrated header column composed of cell R2, C1, cell R2, C2, cell R3, C1, cell R3, C2, cell R4, C1, and cell R4, C2. For example, a red border may be applied to the integrated header column. After the border style of the table drawing tool 1415 is applied to the outer border of the integrated header column at step 1345, the method proceeds to step 1350.

Referring now to FIG. 14C, at step 1350, the text 1460 is aligned within the integrated header column 1465, such as being centered within the integrated header column and adjusted to flow vertically. After the alignment of the text in the integrated header column is adjusted at step 1350, the method ends at step 1399.

The end result displayed to the user is illustrated in FIG. 14C.

Method for Adding a Nested Table to an Existing Table

The table tool also includes the capability of adding a nested table to an existing table. A nested table is a table that is either entirely inside a table cell or entirely surrounds another table. As described in the Background, prior art table tools are incapable of adding a nested table to a table.

Generally described, the method for adding a nested table to an existing table begins after determining that the user wants to add a nested table to an existing table in the document. The nested table is then added as content of a cell in the existing table. It should be understood that the nested table is the content of a cell in the existing table, just as the existing table is content of the document.

Referring now to FIG. 15, a method 1500 for adding a nested table to an existing table in accordance with an embodiment of the present invention will be described. The method 1500 begins at start step 1505 and proceeds to decision step 1510 when a user enters a drawn box using a table drawing tool.

At decision step 1510, it is determined whether any of the borders of the drawn box intersect a cell boundary. Typically, if a border of the drawn box is coincident with a cell boundary, it will not be considered to intersect the cell boundary at decision step 1510. If, at decision step 1510, it is determined that a border of the drawn box intersects a cell boundary, then the method ends at step 1599 because, if a border of the drawn box intersects a cell boundary, the user is probably not trying to draw a nested table. However, if, at decision step 1510, it is determined that no borders of the drawn box intersect a cell boundary, then the method 1500 proceeds to decision step 1515.

At decision step 1515, it is determined whether the borders of the drawn box completely surround a cell or a table. It should be understood that the borders of the drawn box will typically be considered to completely surround a cell or table even if the insertion point of the drawn box is within the hit distance of a cell as long as the end point of the drawn box falls outside of the hit distance of the cell or table. The converse is also true: the borders of the drawn box will typically be considered to completely surround a cell or table even if the end point of the drawn box is within the hit distance of a cell as long as the insertion point of the drawn box falls outside of the hit distance of the cell or table.

If, at decision step 1515, it is determined that the borders of the drawn box do completely surround a cell or table, then the method 1500 proceeds to step 1520. At step 1520, the drawn box is added to the document as a table and the method proceeds to step 1525.

At step 1525, the cell or table that is completely surrounded by the drawn box is added as a nested table to the table added at step 1520. Thus, the cell or table is added as content of the drawn box table, just as a table is normally inserted as content of a document. The method then proceeds to decision step 1530.

Returning now to decision step 1515, if it is determined that the drawn box does not completely surround a cell or table, then the method proceeds to decision step 1530.

At decision step 1530, it is determined whether the drawn box is completely surrounded by a cell. If not, then the method ends at step 1599 because the user has not drawn a nested table. However, if, at decision step 1530, it is determined that the borders of the drawn box are completely surrounded by a cell, then the method proceeds to decision step 1532.

It should be understood that typically, at decision step 1530, a drawn box will be considered to be completely surrounded by a cell even if the insertion point of the drawn box is within the hit distance of the cell as long as the end point of the drawn box is within the cell and outside the hit distance of the cell. The converse is also true: a drawn box will be considered to be completely surrounded by a cell even if the end point is within the hit distance of the cell as long as the insertion point of the drawn box is within the cell and outside the hit distance of the cell.

At decision step 1532, it is determined whether the start and end points of the drawn box fall within the hit area of the surrounding cell found at decision step 1530. If so, then the user is probably trying to draw a diagonal and the method ends at step 1599. However, if the start and end points of the drawn box do not fall within the hit area of the surrounding cell, then the method proceeds to step 1535.

At step 1535, the drawn box is added as a nested table of the cell that surrounds it. The method then ends at step 1599.

To demonstrate method 1500, examples are provided in reference to FIGS. 16A, 16B, 16C, 16D, and 16E. Referring now to FIG. 16A, an existing table 1602, a drawn box 1604 and a table drawing tool 1606 are illustrated. It should be understood that drawn box 1604 is typically drawn using table drawing tool 1606. For example, the drawn box 1604 may be drawn by moving table drawing tool to insertion point 1608, clicking and holding down the mouse button on mouse 542, and moving the mouse 542 to end point 1610.

Referring now to FIG. 15 and FIG. 16A, the method 1500 for adding a nested table begins at start step 1505 and proceeds to decision step 1510. At decision step 1510, it is determined that the borders of the drawn box 1604 do not intersect a cell boundary and the method 1500 proceeds to decision step 1515.

At decision step 1515, it is determined that the borders of the drawn box 1604 completely surround the existing table 1602 and the method 1500 proceeds to step 1520. At step 1520, the drawn box 1604 is added to the document as a table and the method proceeds to step 1525. At step 1525, the existing table 1602 that is completely surrounded by the drawn box 1604 is added as a nested table to the table added at step 1520. Thus, the cell or table is added as content of the drawn box table, just as a table is normally inserted as content of a document. The method then proceeds to decision step 1530 and then the method proceeds from decision step 1530 and ends at step 1599.

Referring now to FIG. 16B for another example, an existing table 1612, a drawn box 1614 and a table drawing tool 1616 are illustrated. It should be understood that drawn box 1614 is typically drawn using table drawing tool 1616. For example, the drawn box 1614 may be drawn by moving table drawing tool to insertion point 1618, clicking and holding down the mouse button on mouse 542, and moving the mouse 542 to end point 1620.

Referring now to FIGS. 15 and 16B, the method 1500 for adding a nested table begins at start step 1505 and proceeds to decision step 1510. At decision step 1510, it is determined that the borders of the drawn box 1614 do not intersect a cell boundary and the method 1500 proceeds to decision step 1515.

At decision step 1515, it is determined that the borders of the drawn box do not completely surround a cell or a table and the method proceeds to decision step 1530.

At decision step 1530, it is determined that the drawn box is completely surrounded by a cell 1619 and the method proceeds to decision step 1532. At decision step 1532, it is determined that the start and end points of the drawn box do not fall within the hit area of the surrounding cell, and the method proceeds to step 1535.

At step 1535, the drawn box 1614 is added to the document as a nested table of the cell 1619 that surrounds it. The method then ends at step 1599.

It should also be understood that it is possible to draw around an existing nested table yet still draw the entire box within a single cell of a table. For example, the box 1614 could surround a nested table that already exists in the same cell 1619.

Referring now to FIG. 16C for another example, an existing table 1622, a drawn box 1624 and a table drawing tool 1626 are illustrated. It should be understood that drawn box 1624 is typically drawn using table drawing tool 1626. For example, the drawn box 1624 may be drawn by moving table drawing tool to insertion point 1630, clicking and holding down the mouse button on mouse 542, and moving the mouse 542 to end point 1628.

Referring now to FIGS. 15 and 16C, the method 1500 for adding a nested table begins at start step 1505 and proceeds to decision step 1510. At decision step 1510, it is determined that the borders of the drawn box 1624 do not intersect a cell boundary and the method proceeds to decision step 1515. Typically, if a border of the drawn box is coincident with a cell boundary, such as in FIG. 16C, it will not be considered to intersect the cell boundary at decision step 1510.

At decision step 1515, it is determined that the borders of the drawn box 1624 completely surround table 1622 and the method proceeds to step 1520. It should be understood that the borders of the drawn box 1624 are considered to completely surround the table 1622 because, even though the end point 1628 of the drawn box 1624 is within the hit distance of table 1622, the insertion point 1630 of the drawn box falls outside of the hit distance of table 1622.

At step 1520, the drawn box 1624 is added to the document as a table and the method proceeds to step 1525. At step 1525, the table 1622 that is completely surrounded by the drawn box is added as a nested table to the table added at step 1520. The method then proceeds to decision step 1530 and then ends at step 1599.

Referring now to FIG. 16D for another example, an existing table 1632, a drawn box 1634 and a table drawing tool 1636 are illustrated. It should be understood that drawn box 1634 is typically drawn using table drawing tool 1636. For example, the drawn box 1634 may be drawn by moving table drawing tool to insertion point 1638, clicking and holding down the mouse button on mouse 542, and moving the mouse 542 to end point 1640.

Referring now to FIGS. 15 and 16D, at decision step 1510, it is determined that the borders of the drawn box 1634 do not intersect a cell boundary even though some borders of the drawn box 1634 are coincident with the cell boundaries of cell 1639. The method 1500 then proceeds to decision step 1515.

At decision step 1515, it is determined that the borders of the drawn box 1634 do not completely surround a cell or a table and the method proceeds to decision step 1530.

At decision step 1530, it is determined that the drawn box 1634 is completely surrounded by the cell 1639 and the method proceeds to decision step 1532. It should be understood that the drawn box 1634 is considered to be completely surrounded by the cell 1639 even though the insertion point 1638 is within the hit distance of the cell 1639 because the end point 1640 of the drawn box is within the cell 1639 and outside the hit distance of the cell 1639.

At decision step 1532, it is determined that the start and end points of the drawn box do not fall within the hit area of the surrounding cell and the method proceeds to step 1535.

At step 1535, the drawn box 1634 is added as a nested table of the cell 1639 that surrounds it. The method then ends at step 1599.

Referring now to FIG. 16E for still another example, an existing table 1642 and a table drawing tool 1646 are illustrated. The table drawing tool has been moved from an insertion point 1648 to an end point 1650. As illustrated in FIG. 16E, both the end point 1650 and insertion point 1648 are within the hit distance of cell 1649. Thus, a nested table is not added to the document because the user is probably trying to add a diagonal 1644 instead of a nested table.

Method for Merging Cells in a Table

Referring now to FIG. 17, a method 1700 for merging cells in a table in accordance with an embodiment of the present invention is illustrated. The method 1700 begins at start step 1705 and proceeds to decision step 1710, when the user enters a drawn box using the table erasing tool. It should be understood that the drawn box may comprise a single horizontal or vertical line, or a single click of the mouse button while using the table erasing tool.

At decision step 1710, it is determined whether cells of a table need to be merged. Typically, this determination is made to merge cells if the insertion point of the drawn box is outside of a hit area of a cell border and the drawn box crosses at least one cell border, or if the insertion point is inside a hit area of a cell border. It should also be understood that if the start or end point of the drag is outside the hit area, it is a merge but the contents of the resulting merged cell are also deleted.

If, at decision step 1710, it is determined that cells do not need to be merged, then the method 1700 ends at step 1799. However, at decision step 1710, if it is determined that cells do need to be merged, then the method 1700 proceeds to step 1715.

At step 1715, cells in each row of the drawn box are merged, if possible. It should be understood that, under certain circumstances, a merger of cells may not be possible. For example, in the preferred application program module, L-shaped cells are not possible. Therefore, under these circumstances, it may be necessary to suppress one or more cell borders rather than actually merging cells. The method then proceeds to step 1720.

At step 1720, cells in each column of the drawn box are merged, if possible. Once again, it should be understood that, under certain circumstances, a merger of cells may not be possible. For example, in the preferred application program module, L-shaped cells are not possible. Therefore, under these circumstances, it may be necessary to suppress one or more cell borders rather than actually merging cells. The method then proceeds to decision step 1725.

At decision step 1725, it is determined whether there were any successful horizontal or vertical merges at steps 1720 or 1725. If not, then the method ends at step 1799. However, if, at decision step 1725, it is determined that there was a successful horizontal or vertical merger of cells, then the method returns to step 1715. It should be understood that the reasoning behind this return to step 1715 is that if there was a successful merger, then it is possible that there are new mergers that may occur because of the successful merger.

To demonstrate method 1700, an example is provided in reference to FIGS. 18A and 18B. Referring now to FIG. 18A, an existing table 1805, a drawn box 1810 and a table erasing tool (eraser icon) 1815 are illustrated. It should be understood that drawn box 1810 is typically drawn using table erasing tool 1815. For example, the drawn box 1810 may be drawn by moving table erasing tool to insertion point 1820, clicking and holding down the mouse button on mouse 542, and moving the mouse 542 to end point 1825. The mouse button may then be released to merge cells as described below. As shown in FIG. 18A, the drawn box 1810 is represented by dashed lines to show that the user has not released the mouse button.

Referring now to FIG. 17 and FIG. 18A, the method 1700 for merging cells in a table begins at start step 1705 and proceeds to decision step 1710 when the user enters the drawn box 1810 using the table erasing tool 1815.

At decision step 1710, it is determined that cells of a table need to be merged because the insertion point 1820 of the drawn box 1810 is outside of a hit area of a cell border and the drawn box crosses at least one cell border, i.e. cell border 1830. The method 1700 proceeds to step 1715.

At step 1715, cells 1840 and 1845 in row 1835 of the drawn box 1810 are merged. The method then proceeds to step 1720.

At step 1720, no cell merger along columns is possible because drawn box 1810 only covers one row, i.e., row 1835 of table 1805. The method then proceeds to decision step 1725. At decision step 1725, it is determined that there was a 35 successful horizontal merge at step 1720, so the method returns to step 1715. However, at steps 1715 and 1720, there are no further horizontal or vertical merges that may take place and the method ends at step 1799.

The end result displayed to the user is illustrated in FIG. 18B.

To further demonstrate method 1700, another example is provided in reference to FIGS. 19A and 19B. Referring now to FIG. 19A, an existing table 1905, a drawn box 1910 and a table erasing tool 1915 are illustrated. It should be understood that drawn box 1910 is typically drawn using table erasing tool 1915. For example, the drawn box 1910 may be drawn by moving table drawing tool to insertion point 1920, clicking and holding down the mouse button on mouse 542, and moving the mouse 542 to end point 1925. The mouse button may then be released to merge cells as described below. As shown in FIG. 19A, the drawn box 1910 is represented by dashed lines to show that the user has not released the mouse button.

Referring now to FIG. 17 and FIG. 19A, the method 1700 for merging cells in a table begins at start step 1705 and proceeds to decision step 1710 when the user enters the drawn box 1910 using the table erasing tool 1915.

At decision step 1710, it is determined that cells of the table 1905 need to be merged because the insertion point 1920 of the drawn box 1910 is outside of a hit area of a cell border and the drawn box crosses at least one cell border, i.e., cell border 1930. The method 1700 proceeds to step 1715.

At step 1715, cells in each row of the drawn box are merged, if possible. However, in the example illustrated in FIG. 19A, no horizontal mergers are possible in rows 1935 and 1940 because the drawn box 1910 does not cross any column boundaries (vertical borders). The method then proceeds to step 1720.

At step 1720, cells in each column of the drawn box are merged, if possible. However, cells 1945 and 1950 may not be merged, in the case of the preferred application program module, because a merger would form an L-shaped cells. Therefore, cell border 1930 is suppressed rather than actually merging cells. The method then proceeds to decision step 1725.

At decision step 1725, it is determined that there were no successful horizontal or vertical merges at steps 1720 or 1725 and the method ends at step 1799.

The end result displayed to the user is shown in FIG. 19B. It should be noted that cell border 1930 is illustrated as a dashed line in FIG. 19B to illustrate that it is suppressed. If the table 1905 is printed, the cell border 1930 will not appear. However, for certain functions, it is helpful to the user to understand that cells 1945 and 1950 are not a single merged cell, but instead are two separate cells.

To further demonstrate method 1700, another example is provided in reference to FIGS. 20A, 20B, 20C, 20D, and 20E. Referring now to FIG. 20A, an existing table 2005, a drawn box 2010 and a table erasing tool 2015 are illustrated. It should be understood that drawn box 2010 is typically drawn using table erasing tool 2015. For example, the drawn box 2010 may be drawn by moving table erasing tool to insertion point 2020, clicking and holding down the mouse button on mouse 542, and moving the mouse 542 to end point 2025. The mouse button may then be released to merge cells as described below. As shown in FIG. 20A, the drawn box 2010 is represented by dashed lines to show that the user has not released the mouse button.

Referring now to FIG. 17 and FIG. 20A, the method 1700 for merging cells in a table begins at start step 1705 and proceeds to decision step 1710 when the user enters the drawn box 2010 using the table erasing tool 2015.

At decision step 1710, it is determined that cells of the table 2005 need to be merged because the insertion point 2020 of the drawn box 2010 is outside of a hit area of a cell border and the drawn box crosses at least one cell border. The method 1700 proceeds to step 1715.

At step 1715, cells in each row of the drawn box are merged, if possible. For sake of convenience, the rows in table 2005 have been labeled R1–R6 and the columns of table 2005 have been labeled C1–C5. Thus, cell 2030 may be designated cell R1, C5 and all other cells may be similarly designated. The method 1700 starts at the lowest row crossed by the drawn box 2010. In this example, that row is row R4. Row R4 is merged to eliminate cell borders 2035 and 2040 resulting in merged cell 2047 illustrated in FIG. 20B. Row R3 is then merged to eliminate cell borders 2050 and 2052, resulting in merged cell 2054 illustrated in FIG. 20C. Row R2 is then merged to eliminate cell borders 2056 and 2058, resulting in merged cell 2060 illustrated in FIG. 20D. The method then proceeds to step 1720.

At step 1720, cell 2060 and cell 2054 cannot be merged because it would form an L-shaped merged cell, so the border formatting between 2060 and 2054 is suppressed. However, cells 2054 and 2047 may be merged to form cell 2062 illustrated in FIG. 20E. The method then proceeds to decision step 1725.

At decision step 1725, it is the case that there were successful merges at steps 1720 or 1725 so the method returns to step 1715. It should be understood that the reasoning behind this return to step 1715 is that if there was a successful merger, then it is possible that there are new mergers that may occur because of the successful merger. However, at steps 1715 and 1720, there are no further horizontal or vertical merges that may take place and the method ends at step 1799.

The end result displayed to the user is illustrated in FIG. 20E.

To further demonstrate method 1700, still another example is provided in reference to FIGS. 21A, 21B, 21C, 21D, 21E, and 21F. Referring now to FIG. 21A, an existing table 2105, a drawn box 2110 and a table erasing tool 2115 are illustrated. It should be understood that drawn box 2110 is typically drawn using table erasing tool 2115. For example, the drawn box 2110 may be drawn by moving the table erasing tool to insertion point 2120, clicking and holding down the mouse button on mouse 542, and moving the mouse 542 to end point 2125. The mouse button may then be released to merge cells as described below. As shown in FIG. 21A, the drawn box 2110 is represented by dashed lines to show that the user has not released the mouse button.

Referring now to FIG. 17 and FIG. 21A, the method 1700 for merging cells in a table begins at start step 1705 and proceeds to decision step 1710 when the user enters the drawn box 2110 using the table erasing tool 2115.

At decision step 1710, it is determined that cells of table 2105 need to be merged because the insertion point 2120 of the drawn box 2110 is outside of a hit area of a cell border and the drawn box crosses at least one cell border. The method 1700 proceeds to step 1715.

At step 1715, cells in each row of the drawn box are merged, if possible. Cell 2130 and cell 2135 are attempted to be merged, but cannot be because the merged cell would be L-shaped. Therefore, the border 2137 of cell 2130 is suppressed as illustrated in FIG. 21B. Cell 2140 is attempted to be merged with cell 2135, but cannot because the merged cell would be L-shaped. Therefore, the border 2152 is suppressed as illustrated in FIG. 21C. Referring to FIG. 21B, cell 2150 and cell 2145 are merged to form merged cell 2154 illustrated in FIG. 21C. The method then proceeds to step 1720.

At step 1720, cells in each column of the drawn box are merged, if possible. Cell 2154 and cell 2135 cannot be merged, so the border 2158 between them is suppressed. Cell 2154 and cell 2140 cannot be merged, so the border 2160 between the cells is suppressed. Cell 2140 and 2130 are merged to form merged cell 2156. The results of the suppression and merging described above is illustrated in FIG. 21D. The method then proceeds to decision step 1725.

At decision step 1725, it is determined that there was a successful merge and the method returns to step 1715. At step 1715, cell 2156 and cell 2135 are merged to form merged cell 2162 illustrated in FIG. 21E. The method then proceeds to step 1720.

At step 1720, cell 2154 and cell 2162 are merged to form merged cell 2164 illustrated in FIG. 21F. The method then proceeds to decision step 1725.

At decision step 1725, it is determined that there was a successful merge and the method returns to step 1715. However, at steps 1715 and 1720, there are no further horizontal or vertical merges that may take place and the method ends at step 1799.

The end result displayed to the user is illustrated in FIG. 21F.

From the foregoing description, it will be apparent to those skilled in the art that the present invention provides a method and system for adding an integrated header, adding a nested table to a table, and merging or deleting cells of a table.

Although the present invention has been described above as implemented in the preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. For an electronic system for creating and editing an electronic file including a table, the table comprising a first row and a first column, a method for creating an integrated header row within the table in the electronic file, the method comprising the steps of:

receiving an indication to add the integrated header row, wherein the indication comprises receiving dimensions of a drawn box from a user input defining the boundaries of the integrated header row;

adding a second row above the first row;

splitting the first row into a third and a fourth row, so that the table comprises the second row, the third row, and the fourth row;

splitting the first column into a second column, a third column, and a fourth column, so that the table comprises the second column, the third column, and the fourth column, wherein the table comprises a plurality of cells defined by intersections of the rows and the columns of the table, each cell comprising borders defining a boundary for each cell;

suppressing the borders of cells that are not part of the table or part of the integrated header row;

merging the cells within the integrated header row; and adding the integrated header into the table.

2. The method recited in claim 1 further comprising the step of applying a border style to the borders of the integrated header row.

3. The method recited in claim 1, wherein the integrated header row further comprises text, and the method further comprises the step of aligning the text within the integrated header row.

4. The method of claim 1, wherein the drawn box comprises data entered by a table drawing tool.

5. For an electronic system for creating and editing an electronic file including a table, the table comprising a first row and a first column, a method for creating an integrated header column within the table in the electronic file, the method comprising the steps of:

receiving an indication to add an integrated header row, wherein the indication comprises receiving dimensions of a drawn box defining the boundaries of the integrated header column;

adding a second column aside the first column;

splitting the first column into a third column and a fourth column, so that the table comprises the second column, the third column, and the fourth column;

splitting the first row into a second row, a third row, and a fourth row, so that the table comprises the second row, the third row, and the fourth row, wherein the table comprises a plurality of cells, defined by intersections of the rows and the columns of the table, each cell comprising borders defining the boundaries of the cell;

suppressing the borders of cells that are not part of the table or part of the integrated header column;

merging the cells within the integrated header column; and adding the integrated header into the table.

6. The method recited in claim 5 further comprising the step of applying a border style to the integrated header column.

7. The method recited in claim 5, wherein the integrated header column further comprises text, and the method further comprises the step of aligning the text within the integrated header column.

8. For an electronic system for creating and editing an electronic file including a table, the table comprising at least one row and at least one column, the table comprising a plurality of cells comprising a plurality of vertical cell borders and a plurality of horizontal cell borders, a method for merging the plurality of cells, the method comprising the steps of:

(a) receiving an indication to merge cells, the indication comprising at least one cell border for deletion, wherein the indication is a drawn box and wherein the at least one cell border indicated for deletion is a cell border that is intersected by the drawn box or completely contained within the drawn box;

(b) determining whether an insertion point of the drawn box is outside of a predetermined hit area of the vertical cell borders and the horizontal cell borders:

if so, then determining whether the drawn box crosses at least one cell border; and if so, then determining that the cells including at least one cell border within the drawn box and the cells intersected by the drawn box may be merged;

(c) determining whether the insertion point of the drawn box is inside the predetermined hit area of a first vertical cell border or a first horizontal cell border;

if so, then determining whether the drawn box crosses into the predetermined hit area of at least a second cell border; and if so, then determining that the cells including at least one cell border within the drawn box and the cells intersected by the drawn box may be merged;

(d) merging cells horizontally across each row that includes at least one indicated cell border;

(e) merging cells vertically across each column that includes at least one indicated cell border;

(f) determining whether a successful merger of cells occurred at steps (d) or (e); and, if so, then repeating steps (b)–(e).

9. The method recited in claim 8 wherein the drawn box is entered using a table erasing tool.

10. A computer-readable medium having computer-executable instructions for performing the steps recited in claim 8.

* * * * *